United States Patent
Shein et al.

(10) Patent No.: US 9,510,518 B2
(45) Date of Patent: Dec. 6, 2016

(54) SHEET METAL STRUCTURE

(71) Applicants: Dimitri Shein, Anchorage, AK (US);
Rodney Pittman, Anchorage, AK (US)

(72) Inventors: Dimitri Shein, Anchorage, AK (US);
Rodney Pittman, Anchorage, AK (US)

(73) Assignee: Dimitri Shein, Anchorage, AK (US)

( * ) Notice: Subject to any disclaimer, the term of this patent is extended or adjusted under 35 U.S.C. 154(b) by 264 days.

(21) Appl. No.: 14/065,287

(22) Filed: Oct. 28, 2013

(65) Prior Publication Data

US 2014/0055018 A1   Feb. 27, 2014

Related U.S. Application Data

(63) Continuation-in-part of application No. 13/678,995, filed on Nov. 16, 2012, now abandoned.

(60) Provisional application No. 61/670,123, filed on Jul. 11, 2012.

(51) Int. Cl.
| | |
|---|---|
| *A01G 9/02* | (2006.01) |
| *A47B 47/00* | (2006.01) |
| *B65D 6/16* | (2006.01) |
| *B65D 6/00* | (2006.01) |
| *B65D 6/26* | (2006.01) |

(52) U.S. Cl.
CPC .............. *A01G 9/02* (2013.01); *A01G 9/026* (2013.01); *A47B 47/0066* (2013.01); *B65D 7/12* (2013.01); *B65D 7/24* (2013.01); *B65D 7/30* (2013.01)

(58) Field of Classification Search
CPC .......... A01G 9/02; A01G 9/026; B65D 7/12; B65D 7/24; B65D 7/30; A47B 47/0066
USPC ........... 47/66.1, 66.2, 66.3, 68; 220/9.2, 9.3, 220/666, 3.94, 4.26, 4.27, 4.28, 4.32; 119/452, 474, 482
See application file for complete search history.

(56) References Cited

U.S. PATENT DOCUMENTS

| | | | | |
|---|---|---|---|---|
| 459,697 | A * | 9/1891 | Atkinson | B65D 1/225 220/62 |
| 1,088,864 | A * | 3/1914 | Amundson | B65D 11/1873 217/65 |
| 1,259,320 | A * | 3/1918 | Tyler | B61D 17/18 105/423 |
| 1,352,002 | A * | 9/1920 | Jones | A47B 88/0014 220/4.28 |
| 1,355,213 | A * | 10/1920 | Chipperfield | A47B 47/025 220/690 |
| 1,806,610 | A * | 5/1931 | Christensen | A47B 47/03 312/263 |
| 1,850,463 | A * | 3/1932 | Kleczewski | A21B 3/13 220/4.28 |
| 1,858,902 | A | 5/1932 | Prantl | |
| 2,072,395 | A | 3/1937 | Dodson | |
| 2,081,023 | A | 5/1937 | Teach | |
| 2,591,104 | A * | 4/1952 | Stone | B65D 7/06 220/4.28 |
| 2,658,101 | A * | 11/1953 | Coxe, Jr. | H04B 1/082 174/51 |
| 2,659,515 | A * | 11/1953 | Miller | B65D 7/24 220/4.28 |

(Continued)

FOREIGN PATENT DOCUMENTS

| | | | | |
|---|---|---|---|---|
| JP | | 06146392 A | * | 5/1994 |
| JP | | 07227147 A | * | 8/1995 |
| JP | | 2002084895 A | * | 3/2002 |

*Primary Examiner* — Son T Nguyen
(74) *Attorney, Agent, or Firm* — AEON Law; Adam L. K. Philipp

(57) ABSTRACT

A sheet metal planter comprises three panel types, can be assembled with readily available tools, can be disassembled to fit in a compact space, can be made in more than one shape, does not require fasteners in one embodiment or places a modest load on fasteners in another embodiment, and is aesthetically pleasing.

14 Claims, 43 Drawing Sheets

(56) References Cited

U.S. PATENT DOCUMENTS

| | | | |
|---|---|---|---|
| 2,732,091 A | 1/1956 | Kass | |
| 2,792,142 A | 5/1957 | Sandkuhle | |
| 2,942,749 A * | 6/1960 | Rosenberg | H05K 5/04 220/4.28 |
| 3,006,496 A | 10/1961 | Weiman | |
| 3,047,183 A | 7/1962 | Papa | |
| 3,164,281 A | 1/1965 | Williams | |
| 3,374,915 A * | 3/1968 | Verhein | B65D 19/12 206/511 |
| 3,760,970 A * | 9/1973 | Lutz | B65D 21/0215 206/511 |
| 3,951,294 A | 4/1976 | Wilson | |
| 3,955,320 A | 5/1976 | Serovy | |
| 3,974,934 A * | 8/1976 | Rohner | B65D 11/1893 220/4.28 |
| 4,044,910 A * | 8/1977 | Box | B65D 11/1833 217/15 |
| 4,173,379 A * | 11/1979 | van der Heiden | B42F 17/08 220/4.31 |
| 4,295,693 A * | 10/1981 | Viklund | A47B 47/03 211/135 |
| 4,363,189 A | 12/1982 | O'Donnell | |
| 4,462,647 A * | 7/1984 | Key | A47B 47/03 312/108 |
| 4,649,667 A | 3/1987 | Kitograd | |
| 4,716,680 A | 1/1988 | Whitcomb | |
| 4,781,300 A * | 11/1988 | Long | D06F 95/002 220/6 |
| 4,901,473 A | 2/1990 | Taule | |
| 4,920,695 A | 5/1990 | Garden | |
| 4,960,223 A * | 10/1990 | Chiang | B65D 11/1833 220/6 |
| 5,161,709 A * | 11/1992 | Oestreich, Jr. | B65D 19/12 220/1.5 |
| 5,360,263 A * | 11/1994 | Nakano | A47B 47/0075 312/257.1 |
| D363,687 S | 10/1995 | Turrentine | |
| 5,597,084 A * | 1/1997 | Parasin | B65D 11/1873 206/600 |
| 5,632,392 A * | 5/1997 | Oh | B65D 11/1833 220/6 |
| D383,707 S | 9/1997 | Waszkiewicz | |
| 5,853,099 A * | 12/1998 | Lessard | B65D 11/1833 220/7 |
| 5,953,858 A | 9/1999 | Loosen | |
| 5,967,356 A * | 10/1999 | Laarhoven | B65D 11/1833 220/4.28 |
| 6,015,056 A * | 1/2000 | Overholt | A45C 7/0036 220/6 |
| 6,018,910 A | 2/2000 | Marks | |
| 6,086,174 A * | 7/2000 | Graves | A47B 47/03 312/263 |
| D455,979 S | 4/2002 | Salenger | |
| 6,393,764 B1 | 5/2002 | Smith | |
| 6,405,888 B1 * | 6/2002 | Overholt | B65D 11/1833 220/1.5 |
| 6,409,041 B1 * | 6/2002 | Overholt | B65D 11/1833 206/503 |
| D462,925 S | 9/2002 | Angulo | |
| 6,644,712 B1 * | 11/2003 | Rafi-Zadeh | B60R 9/00 296/37.16 |
| 6,681,522 B2 | 1/2004 | Marchioro | |
| 6,722,515 B2 * | 4/2004 | Rumpel | B65D 11/1833 220/23.4 |
| D502,425 S | 3/2005 | Barry | |
| 7,140,149 B2 | 11/2006 | Searle | |
| 7,712,254 B2 | 5/2010 | Klohr | |
| 7,886,485 B2 | 2/2011 | Chen | |
| D651,121 S | 12/2011 | Grimme | |
| 2001/0052199 A1 | 12/2001 | Klein | |
| 2002/0007589 A1 | 1/2002 | Marchioro | |
| 2002/0121048 A1 | 9/2002 | Searle | |
| 2005/0155287 A1 | 7/2005 | Phillips | |
| 2005/0193624 A1 | 9/2005 | Singer | |
| 2005/0204621 A1 | 9/2005 | Garrison | |
| 2007/0271843 A1 | 11/2007 | Kirkpatrick | |
| 2008/0092442 A1 | 4/2008 | Singer | |
| 2008/0120905 A1 | 5/2008 | Pai | |
| 2008/0246375 A1 * | 10/2008 | Berg | A47B 47/0066 312/114 |
| 2009/0183429 A1 | 7/2009 | Kim | |
| 2010/0192459 A1 | 8/2010 | Cottier | |
| 2010/0242357 A1 | 9/2010 | Vogler | |
| 2015/0035421 A1 * | 2/2015 | Hsiung | G06F 1/181 312/265.5 |

\* cited by examiner

SHEET METAL STRUCTURE

CROSS-REFERENCE TO RELATED APPLICATIONS

This application is a continuation-in-part of and claims the benefit of U.S. patent application Ser. No. 13/678,995, filed on Nov. 16, 2012, which application claims the benefit of U.S. provisional patent application Ser. No. 61/670,123, filed Jul. 11, 2012, which applications are incorporated herein for all purposes by this reference.

FIELD OF THE INVENTION

Containers for plants and, more specifically, sheet metal planter boxes.

BACKGROUND

Planter boxes hold soil, plants, and other heavy and often damp items. Typically, planter boxes are fabricated from wood, ceramic, or plastic. Planter boxes, when assembled, take up space and are difficult to ship.

Fasteners, panels, structural supports and other components used in the manufacture or assembly of planter boxes are often in contact with the soil and moisture required for the plants. Fasteners and other components often corrode over time, which may lead to collapse of the planter box, release of dirt, damage to plants, and hazardous situations. Ceramic planter boxes are subject to less corrosion, but are heavy, fragile, and subject to breakage. Plastic and composite planter boxes are more durable and resist corrosion, but are subject to deformation due to changes in temperature, are subject to fading in sunlight, and, regardless of deformation, can be less aesthetically pleasing.

DETAILED DESCRIPTION

The description of the drawings and the following detailed description refer to the accompanying drawings. The same feature number in different drawing figures generally identifies the same or similar elements and/or components.

The following description provides specific details for an understanding of various examples of the technology. One skilled in the art will understand that the technology may be practiced without many of these details. In some instances, structures and functions have not been shown or described in detail or at all to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

As used herein, "releasable," "connect," "connected," "connectable," "disconnect," "disconnected," and "disconnectable" refers to two or more structures which may be connected or disconnected, generally without the use of tools (examples of tools including screwdrivers, pliers, drills, saws, welding machines, torches, irons, and other heat sources) and generally in a repeatable manner. As used herein, "attach," "attached," or "attachable" refers to two or more structures or components which are attached through the use of tools or chemical or physical bonding. As used herein, "secure," "secured," or "securable" refers to two or more structures or components which are connected or attached.

Figure 1:
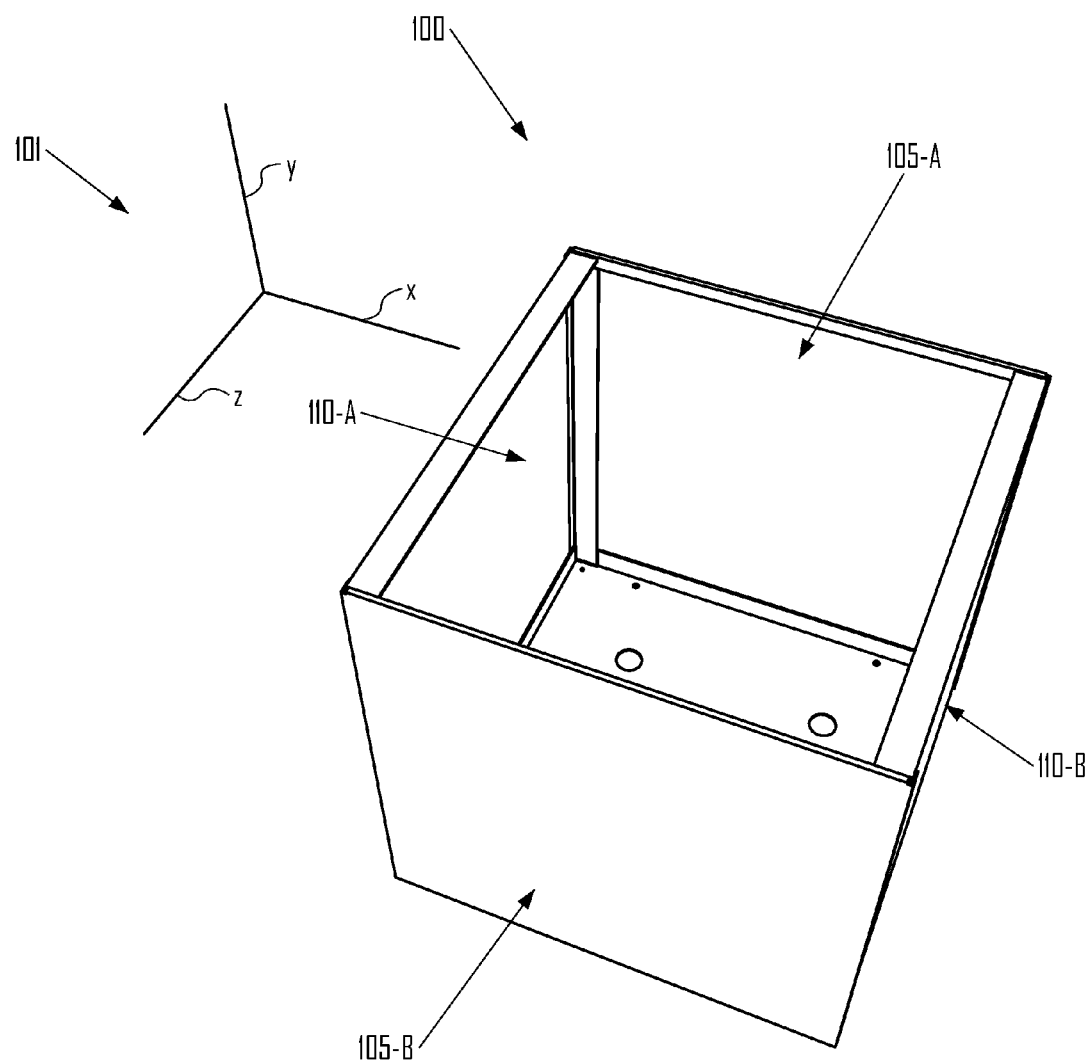
FIG. 1 is perspective view of an embodiment of a Rectangular Planter.

FIG. 1 is perspective view of an illustration of a Rectangular Planter 100. At element 101, FIG. 1 illustrates the x-, y-, and z-axes used to describe the Figures. For the sake of convenience, the Rectangular Planter 100 is illustrated as generally being a cube, within normal variation, manufacturing tolerances, variation desired to obtain nesting components, and the like, though any two opposite sides may be increased or decreased in length, with a corresponding change in the length of the Base 205 along the same coordinate, resulting in a rectangle. As illustrated, the Outside Panel 105-A has a length along the x-axis of 1'4" and a length along the y-axis of 1'3¹⁵⁄₁₆" while the Inside Panel 110-A has a length along the z-axis of 1'3¾" and a length along the y-axis (excluding the Feet 715) of 1'3¹³⁄₁₆".

FIG. 1 illustrates Outside Panels 105-A and 105-B and Inside Panels 110-A and 110-B. Elements in the drawings with the same Figure number followed by a "-A" or "-B" are duplicates and/or a mirror image duplicate (within normal tolerances) of the component with the same Figure number without the "-A" or "-B." For example, Outside Panel 105-A and 105-B are duplicates, rotated 180 degrees relative to one another. References herein may be made to such elements without the "-A" or "-B," in which case the reference is to either element.

The Rectangular Planter 100 is a sheet metal structure, wherein the sheet metal has a generally uniform thickness, X. In the illustrations in this paper (for both the Rectangular Planter 100 and the Vase Planter 1900s), X may be between 16 and 14 gauge, or between ¹⁄₁₆" and ⁵⁄₆₄", though another thickness may be selected, based, for example, on the characteristics of the material, to allow cutting and bending without tearing. The sheet metal may be, for example and without limitation, stainless steel, steel, 304 steel, 316L steel, weathering steel (sold under the trademark COR-TEN®), iron, copper, aluminum, zinc, magnesium, and/or alloys thereof.

Figure 2:
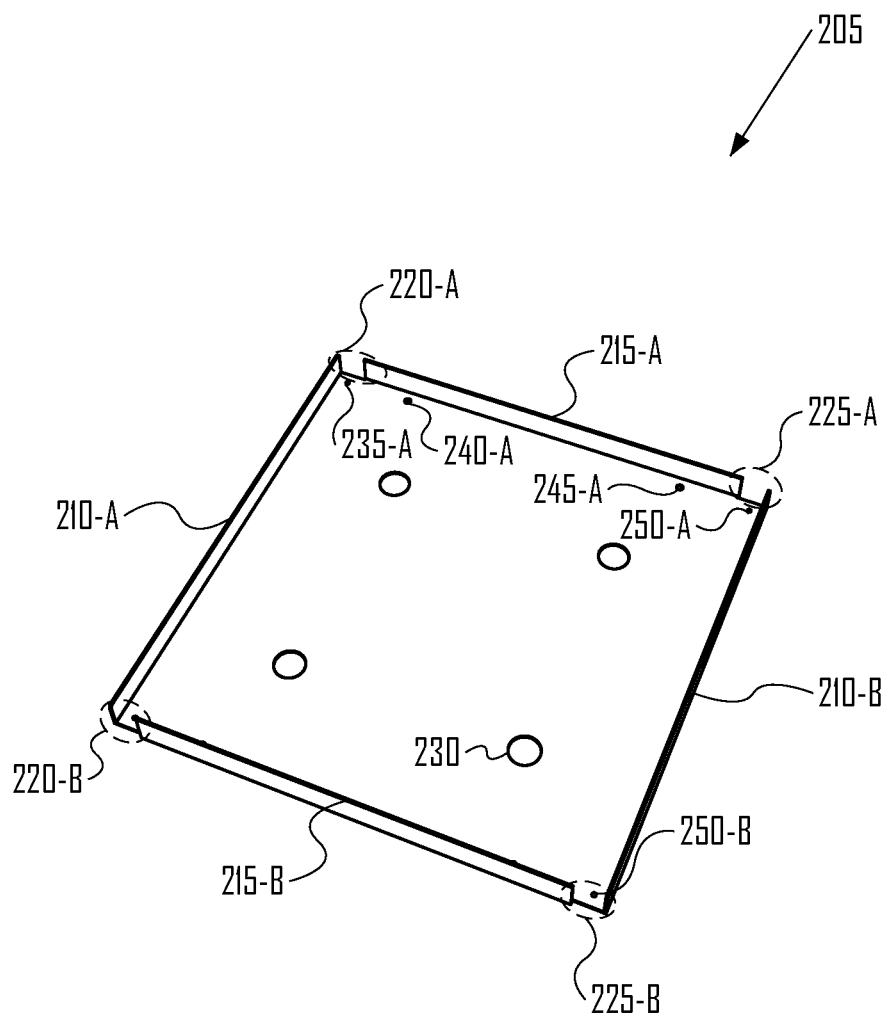
FIG. 2 is a perspective view of an embodiment of a Base of a Rectangular Planter, from the same view angle and distance used in FIG. 1.

FIG. 2 is a perspective view of an embodiment of a Base 205 of a Rectangular Planter 100, from the same view angle and distance used in FIG. 1. The Base 205 is illustrated as comprising 90 Degree Flanges 210-A and 210-B along the z-axis perimeter edges of the Base 205 and 90 Degree Flanges 215-A and 215-B along the x-axis perimeter edges of the Base 205 (the Base 205 only has a y-axis in these 90 Degree Flanges and in the thickness, X, of the material of the Base 205). The 90 Degree Flanges 210-A, 210-B, 215-A, and 215-B are illustrated as being M high. As illustrated in the drawings, M is 1¹⁄₁₆" high, measured from the underside of the Base 205 to the top of the 90 Degree Flange, or 1" high, measured from the top of the Base 205 to the top of the 90 Degree Flange, though another height for M may be used, such as a range between ¼" and 2". The 90 Degree Flanges 210-A, 210-B, 215-A, and 215-B serve to impart rigidity to the Base 205 and to prevent other components (discussed further herein) from moving inward toward the center of the Rectangular Planter 100.

Further illustrated in FIG. 2 are Notches 220-A, 220-B, 225-A, and 225-B. These Notches are all similar or mirror image similar, within normal tolerances. The dimensions of these Notches are described further herein.

Further illustrated in FIG. 2 are Fastener Holes 235-A, 240, 245, and 250-A, the use of which are discussed further herein.

Further illustrated in FIG. 2 are Drain Holes 230, which may allow excess water to drain out of the Rectangular Planter 100. Not shown, an insert may be used in conjunction with the Structure (whether the Rectangular Planter 100, the Vase 1900, or another embodiment of either), such as a plastic, rubber, or composite insert generally conforming to the dimensions of the structure, a plastic bag, or the like.

Figure 3:
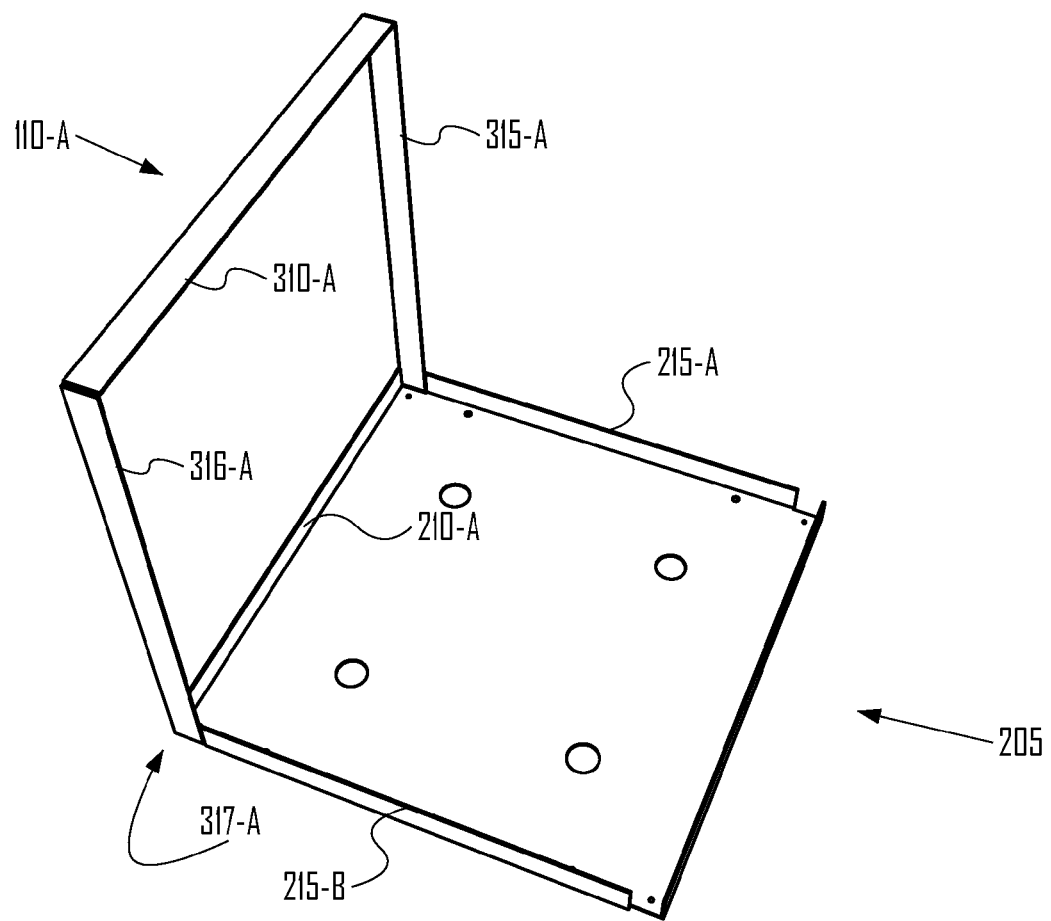
FIG. 3 is a perspective view of an embodiment of an Inside Panel of a Rectangular Planter, from the same view angle and distance used in FIG. 1.

FIG. 3 is a perspective view of an embodiment of an Inside Panel 110-A of a Rectangular Planter 100, from the same view angle and distance used in FIG. 1. FIG. 3 illustrates that the Inside Panel 110-A comprises 90 Degree Flanges 310-A, 315-A, and 316-A. There is also a 90 Degree Flange 317-A (not visible in this Figure) along the bottom z-axis of the Inside Panel 110-A, which 90 Degree Flange is a mirror image of 90 Degree Flange 310-A (which not-shown 90 Degree Flange is indicated by element number 317-A). As illustrated, these 90 Degree Flanges 310-A, 315-A, 316-A, and 317-A extend length Y along the x-axis; as illustrated, Y is 1", though another length could be used, such as, for example, ½" to 3".

Figure 5:
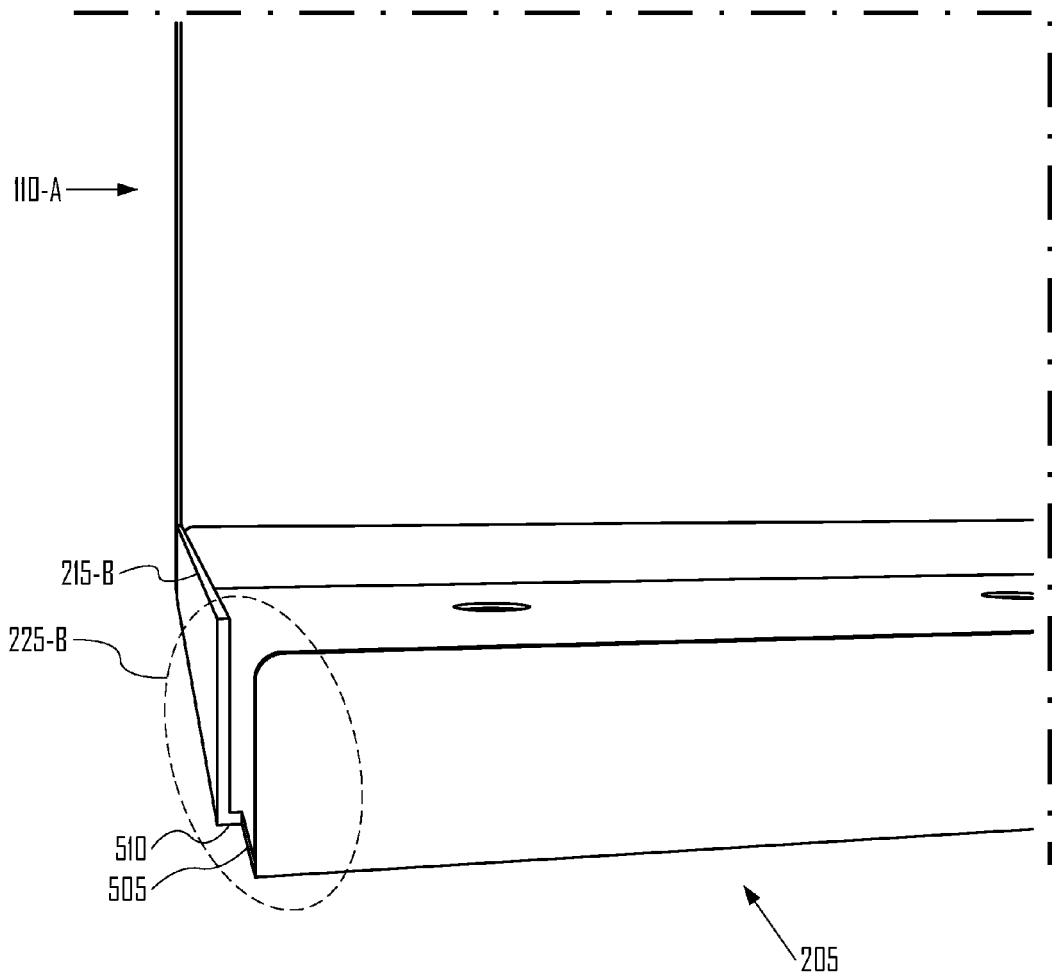
FIG. 5 is a close up perspective view of an embodiment of a portion of a Base and an Inside Panel of a Rectangular Planter.
Figure 38:
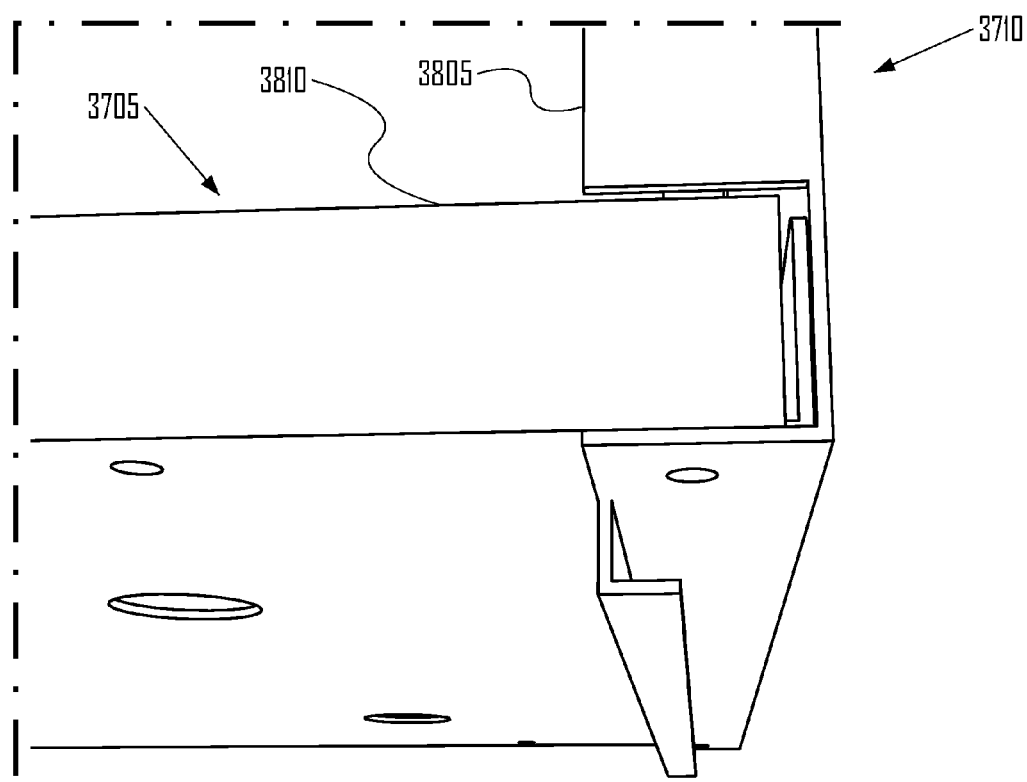
FIG. 38 is a close up perspective view of an alternative embodiment of a Rectangular Planter, illustrating the Base and Inside Panel, from the same view angle and distance used in FIG. 37.
Figure 39:
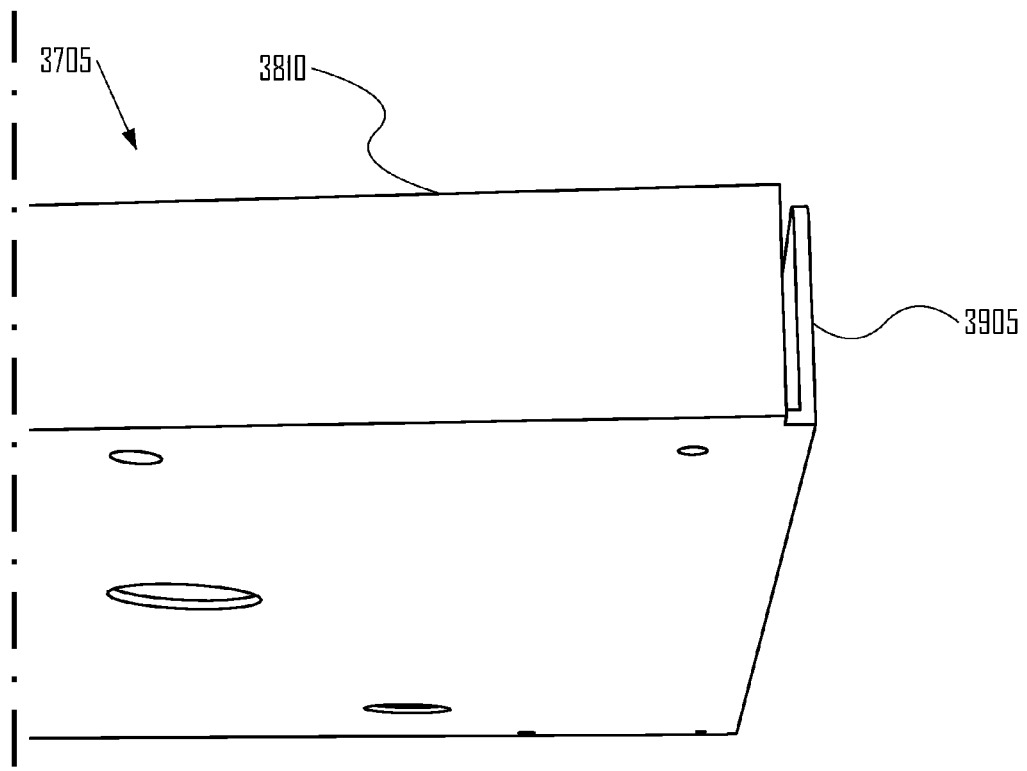
FIG. 39 is a close up perspective view of an alternative embodiment of a Rectangular Planter, illustrating the Base from the same view angle and distance used in FIG. 37.
Figure 40:
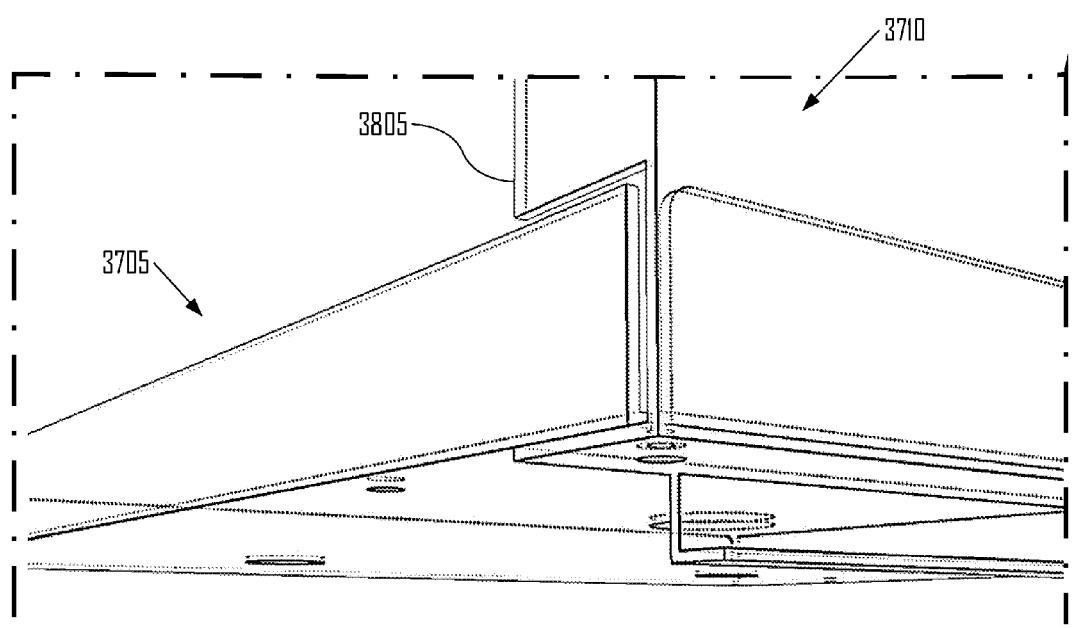
FIG. 40 is a close up perspective view of an alternative embodiment of a Rectangular Planter, illustrating the Base and Inside Panel.
Figure 41:
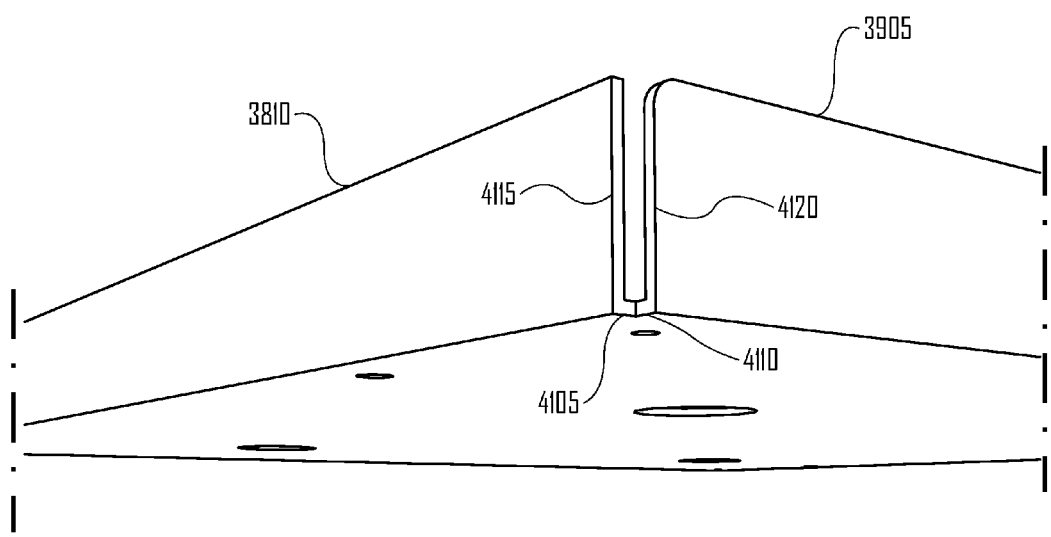
FIG. 41 is a close up perspective view of an alternative embodiment of a Rectangular Planter, illustrating the Base from the same view angle and distance used in FIG. 40.
Figure 42:
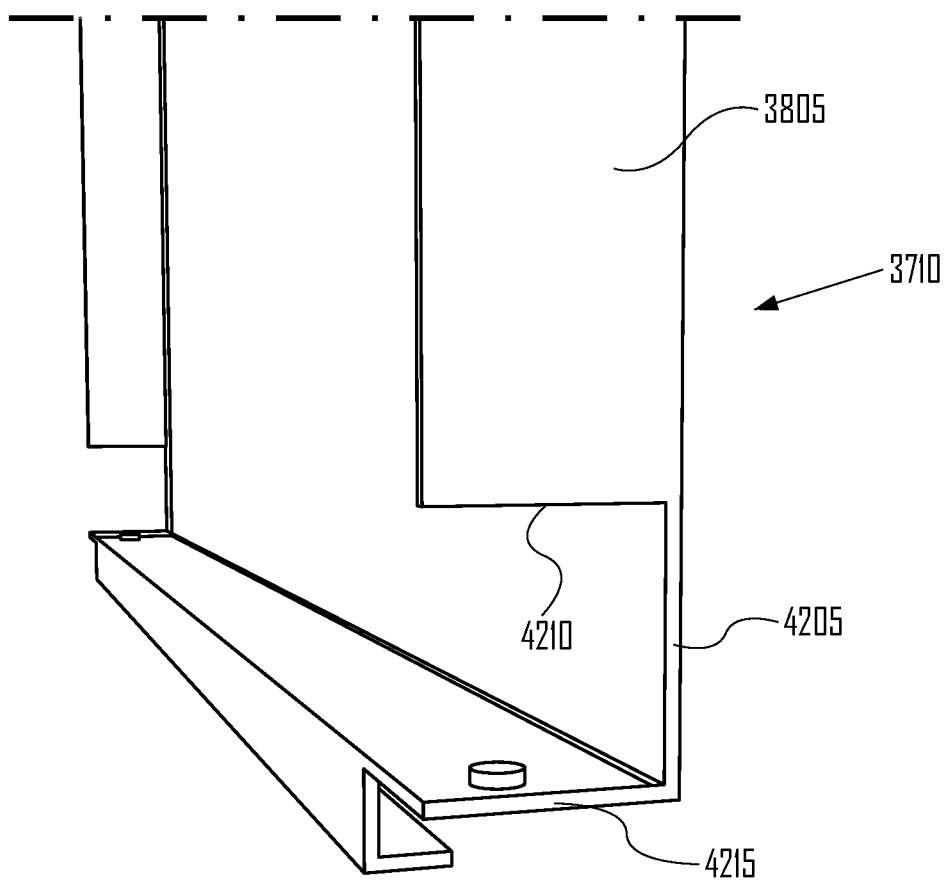
FIG. 42 is a close up perspective view of an alternative embodiment of an Inside Panel.

FIG. 3 illustrates how Base 205 fits within the Inside Panel 110-A due to Notches 220-A and 220-B. FIG. 5 presents a closer view of Notch 225-B, which is a mirror-image of Notch 220-B. This paper illustrates Notches 220-A, 220-B, 225-A, and 225-B as being 2× along the z-axis. In an alternative embodiment, these Notches may only be X along the z-axis. In an alternative embodiment, illustrated in FIGS. 37-42, the 90 Degree Flange 3810 along the x-axis edges of Base 3705 may extend further along the x-axes toward the z-axis of the Base 3705, such as to or proximate to the z-axis edge of Base 3705 (see element 3810 in FIG. 38), while the Inside Panel 3710 may then be notched at the bottom corners to receive the Base 3705 (see element 3805 in FIG. 38). In an alternative embodiment (not shown), the Notches 220-A, 220-B, 225-A, and 225-B may extend further into the Base 205 along the x-axis, such as to accommodate a different length Y (as illustrated, approximately 1").

Figure 4:
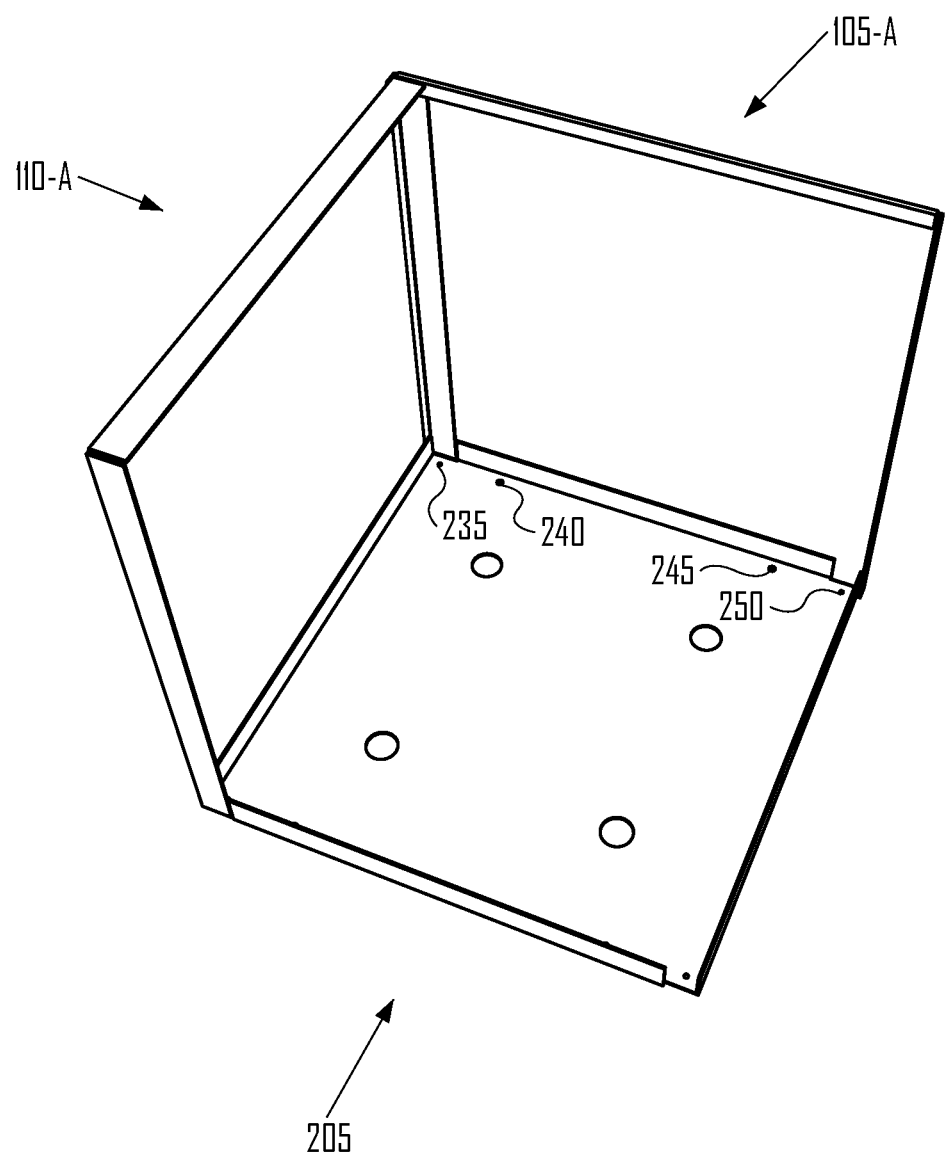
FIG. 4 is a perspective view of an embodiment of an Inside Panel and an Outside Panel of a Rectangular Planter, from the same view angle and distance used in FIG. 1.
Figure 43:
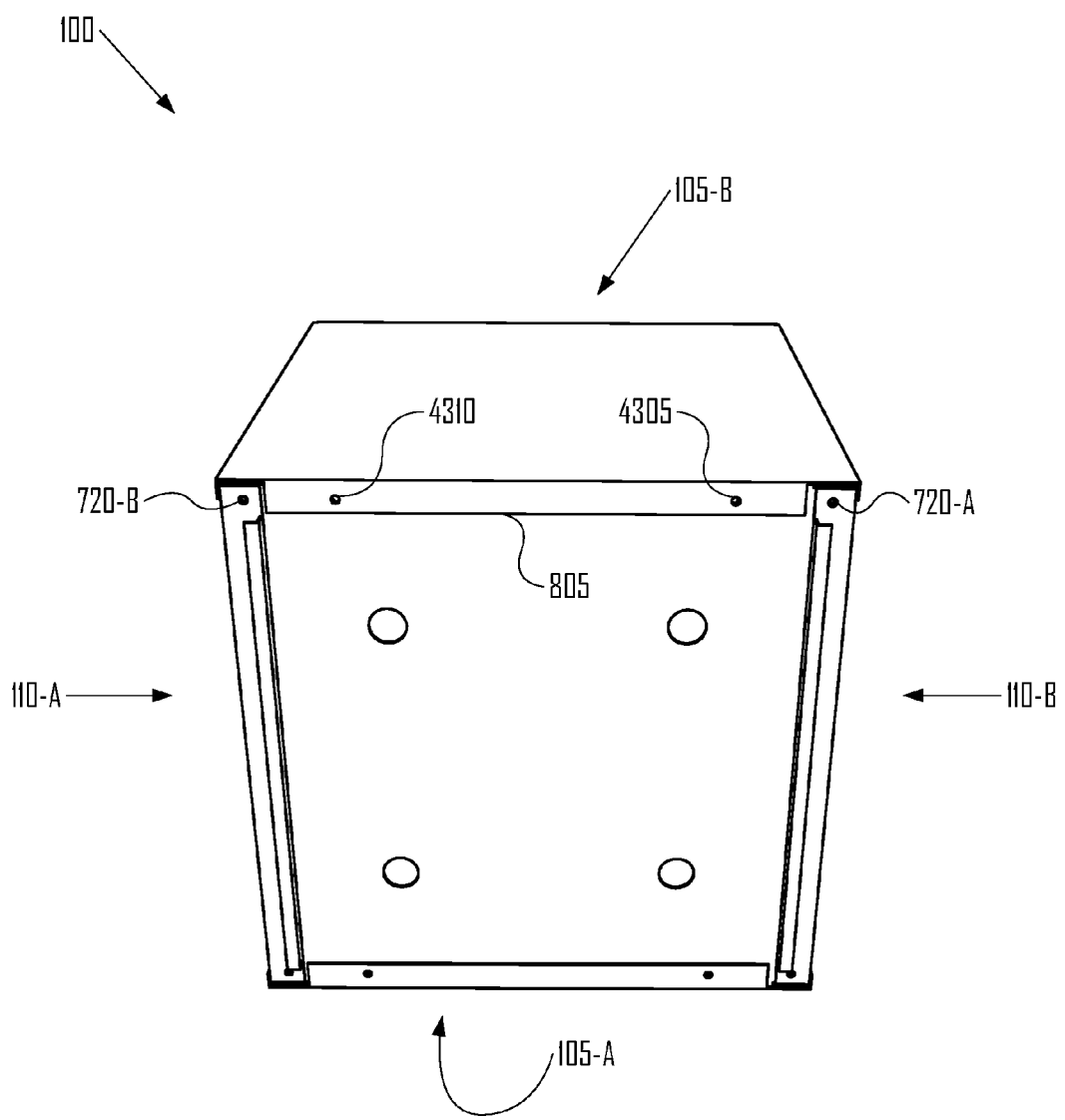
FIG. 43 is a perspective view of the bottom of a Rectangular Planter.

FIG. 4 is a perspective view of an embodiment of an Inside Panel 110-A and an Outside Panel 105-A of a Rectangular Planter 100, from the same view angle and distance used in FIG. 1. This Figure illustrates an overview of how components fit together. Fasteners may be passed through Holes 235-A, 240-A, 245-A, and 250-A and corresponding holes in the Outside Panel 105-A and Inside Panel 110-A (illustrated in FIG. 43 at element 4305, 4310, 720-A, and 720-B) to attach the Base 205 to the Outside Panel 105-A and Inside Panel 110-A.

FIG. 5 is a close up perspective view of an embodiment of a Base 205 and an Inside Panel 110-A of a Rectangular Planter 100. FIG. 5 illustrates a closer view of Notch 225-B, illustrating at element 510 that Base 205 is notched by a length of 2× along the z-axis of Base 205. FIG. 5 also illustrates at element 505 that Notch 225-B extends Y length along the x-axis; as illustrated, Y (the length of element 505 and of 90 Degree Flanges 310-A, 315-A, 316-A, and 317-A) is 1". As noted above, Y may be another length.

Figure 6:
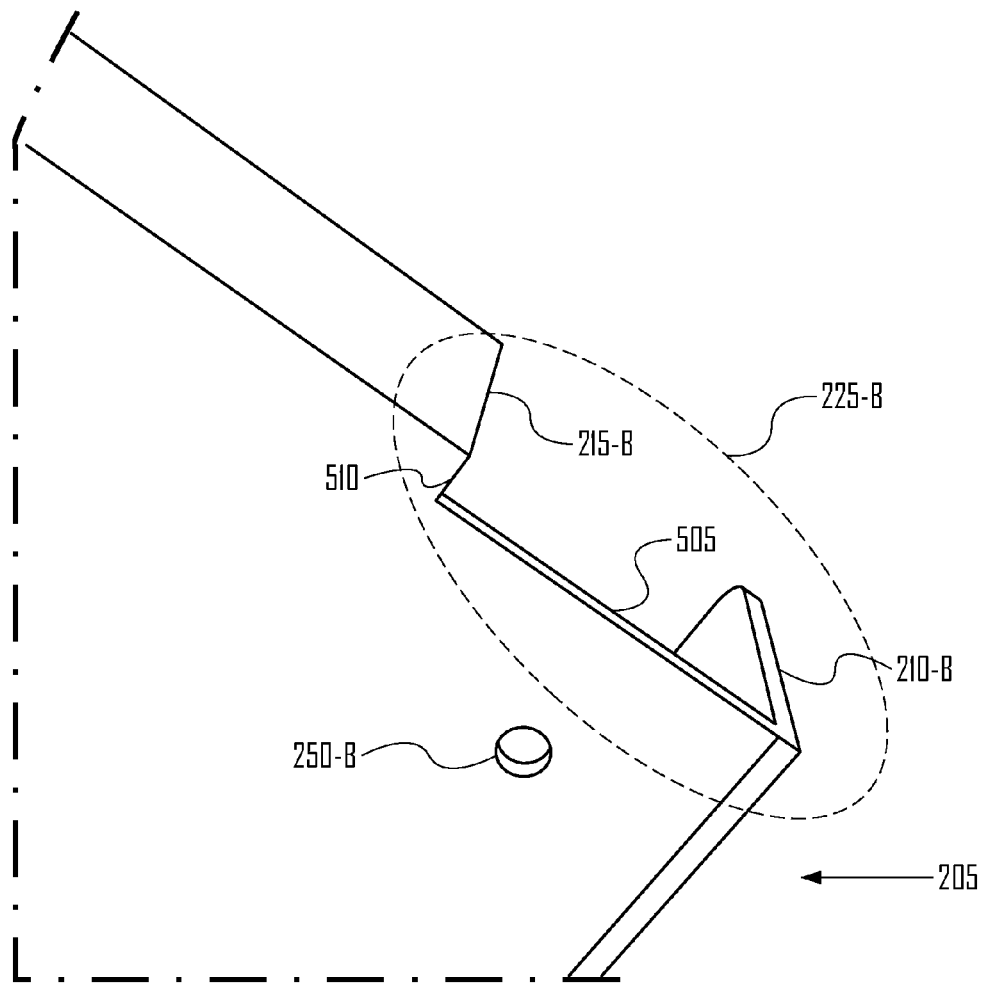
FIG. 6 is a close up perspective view of the bottom of an embodiment of a Base of a Rectangular Planter.

FIG. 6 is a close up perspective view of the bottom of an embodiment of a Base 205 of a Rectangular Planter 100. This view is provided to remove any ambiguity regarding the relationship of the components and to show, in conjunction with FIG. 7-11, how the components fit together at a bottom corner.

Figure 7:
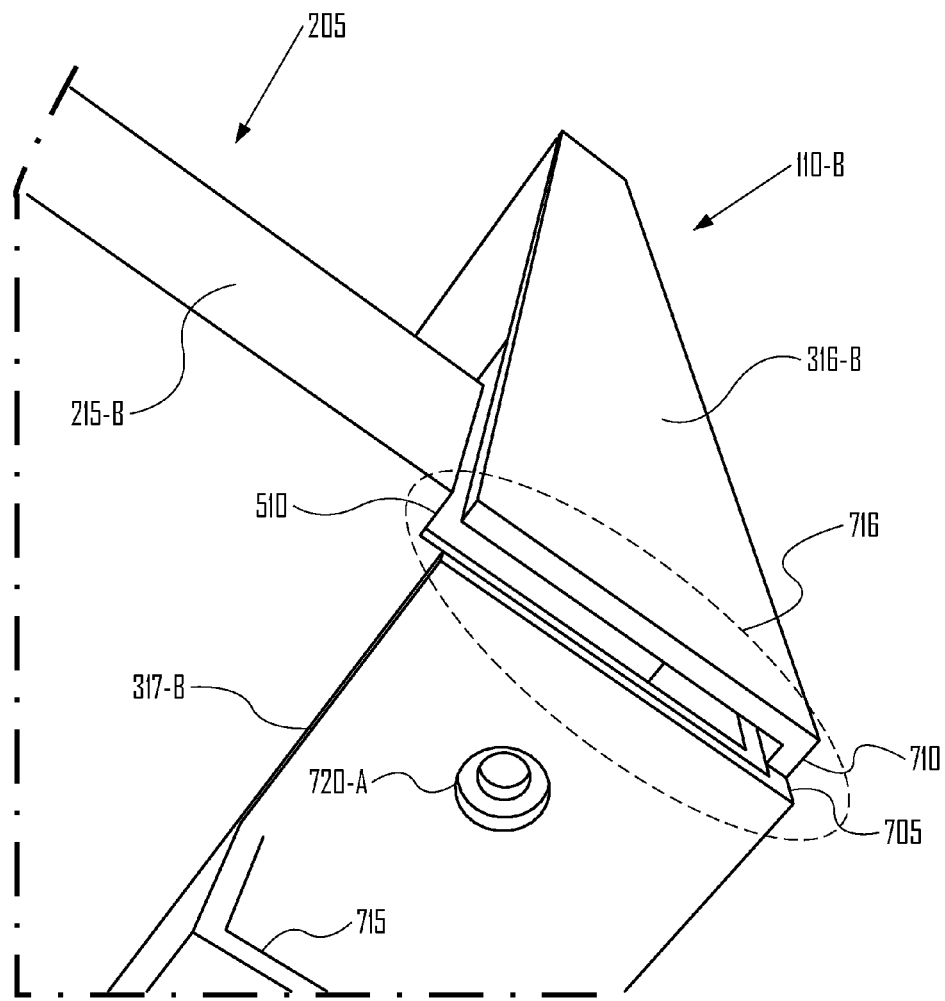
FIG. 7 is a close up perspective view of the bottom of an embodiment of a Base and an Inside Panel of a Rectangular Planter, from the same view angle and distance used in FIG. 6.

FIG. 7 is a close up perspective view of the bottom of an embodiment of a Base 205 and an Inside Panel 110-B of a Rectangular Planter 100, from the same view angle and distance used in FIG. 6. This Figure illustrates Notch 716, which, as illustrated by element 710, is 2× along the z-axis of Inside Panel 110-B, and, as illustrated by element 705, is 2× along the y-axis of Inside Panel 110-B. This Figure also illustrates Fastener Hole 720-A, which is generally centered with Fastener Hole 250-B (see FIG. 6). This Figure also provides a partial view of Foot 715 (another view of Foot 715 is provided in FIG. 16). This Figure also illustrates that 90 Degree Flange 317-A-B on Inside Panel 110-B, contacts the bottom of Base 205. As noted above, in relation to FIG. 4, the Base 205 fits within the 90 Degree Flanges 315 and 316 of the Inside Panels 110. The outside face of 90 Degree Flange 316-B is on the same plane as the outside face of 90 Degree Flange 215-B (the perspective view might be misinterpreted); the bottom corner of 90 Degree Flange 316-B is higher, in the y-axis, than the bottom corner of 90 Degree Flange 215-B (element 705 is 2×; element 710 and 510 are both 2×).

Figure 8:
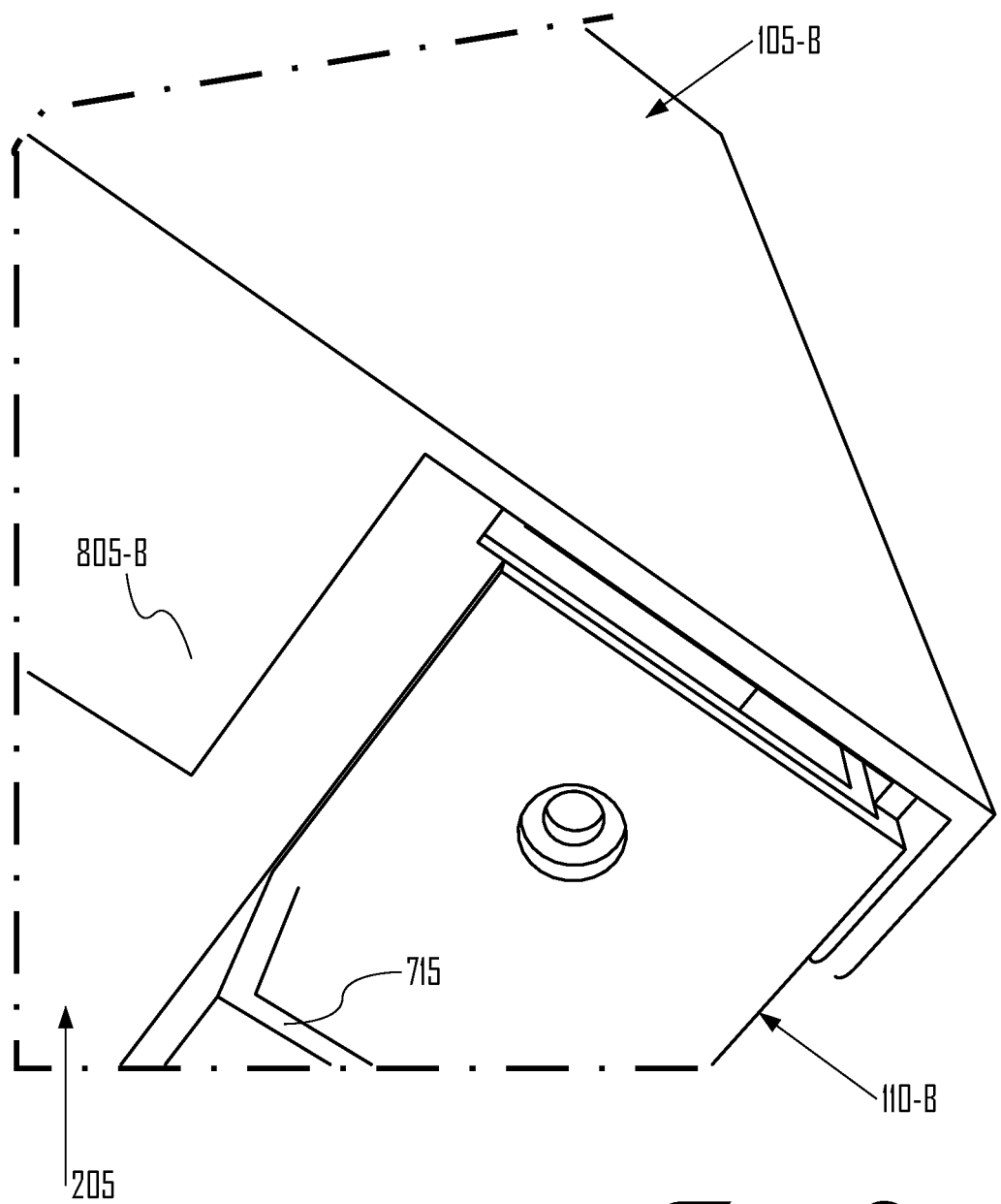
FIG. 8 is a close up perspective view of the bottom of an embodiment of a Base, and Outside Panel, and an Inside Panel of a Rectangular Planter, from the same view angle and distance used in FIG. 6.

FIG. 8 is a close up perspective view of the bottom of an embodiment of a Base 205, and Outside Panel 105-B, and an Inside Panel 110-B of a Rectangular Planter 100, from the same view angle and distance used in FIG. 6. This Figure illustrates that the Outside Panel 105-A fits around the outside of the Inside Panel 110-B. The Outside Panels 105-A and 105-B prevent the Inside Panels 110-A and 110-B from moving outward, away from center of the Rectangular Planter 100. The top of the bottom of 90 Degree Flange 805-B contacts the bottom of Base 205.

Figure 9:
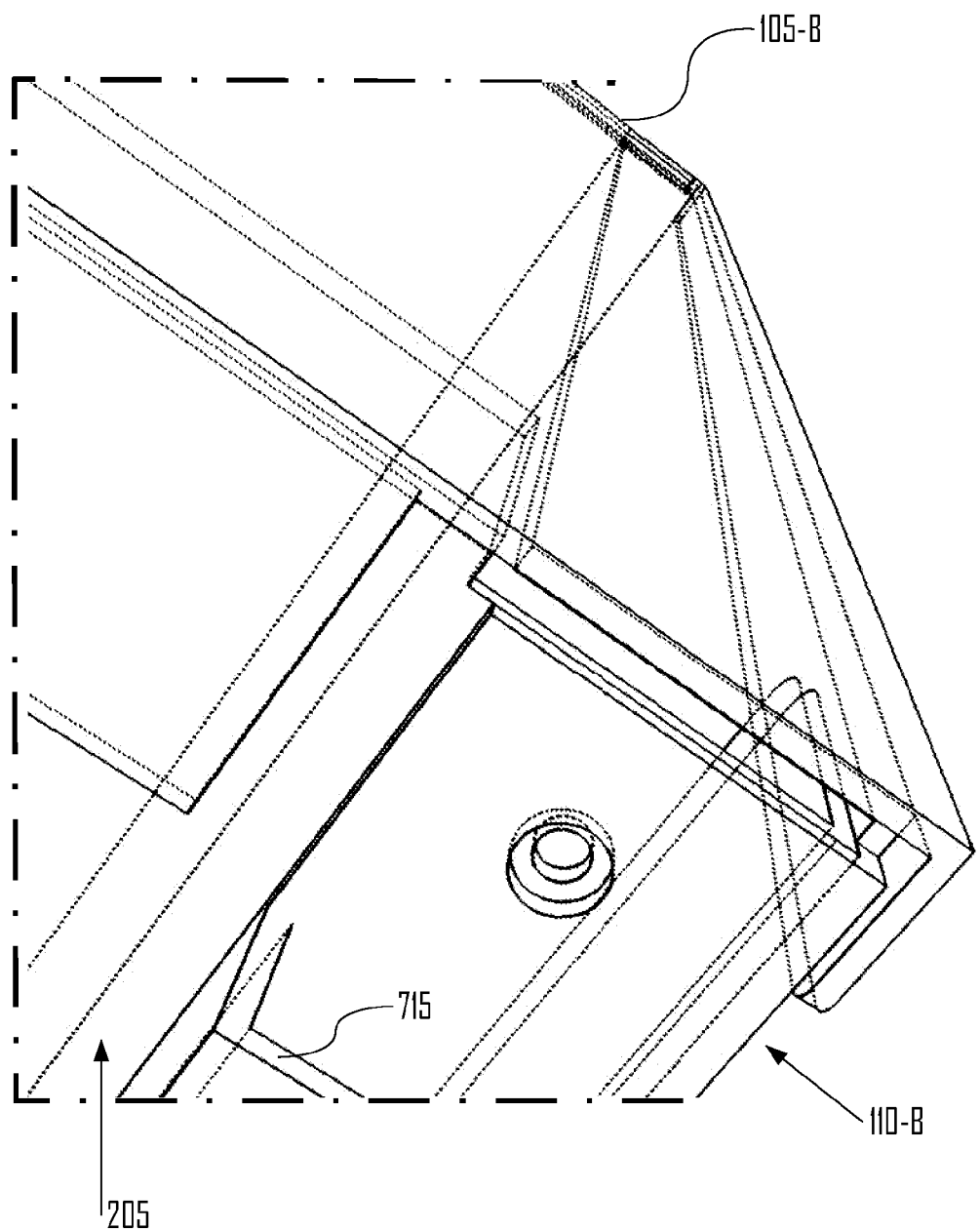
FIG. 9 is a close up perspective view of an embodiment of the bottom of a Base, and Outside Panel, and an Inside Panel of a Rectangular Planter, from the same view angle and distance used in FIG. 6 and with back lines illustrated with dotted lines.

FIG. 9 is a close up perspective view of an illustration of the bottom of an embodiment of a Base 205, and Outside Panel 105-B, and an Inside Panel 110-B of a Rectangular Planter 100, from the same view angle and distance used in FIG. 6 and with back lines illustrated with dotted lines. This view is provided along with FIGS. 6-11 for the sake of illustrating the interlocking components.

Figure 10:
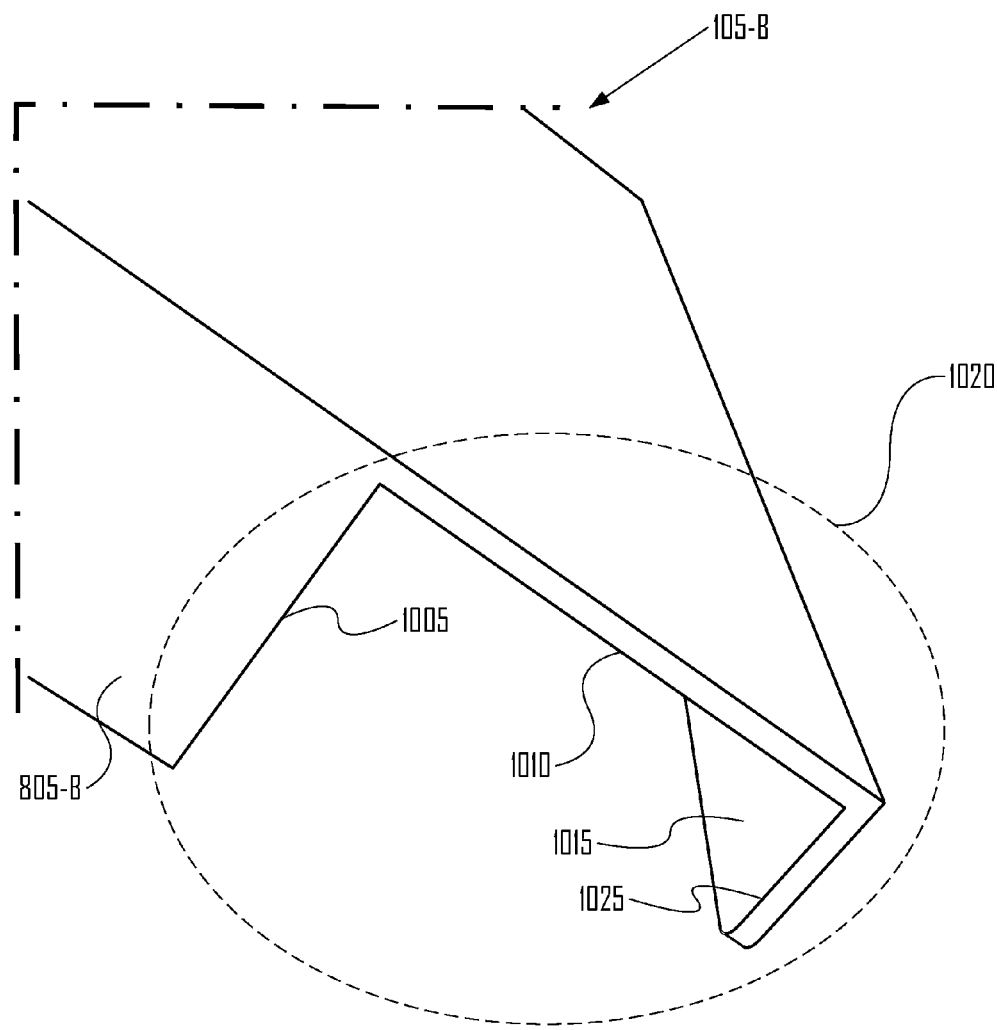
FIG. 10 is a close up perspective view of an embodiment of the bottom of an Outside Panel of a Rectangular Planter, from the same view angle and distance used in FIG. 6.

FIG. 10 is a close up perspective view of an embodiment of the bottom of an Outside Panel 105-B of a Rectangular Planter 100, from the same view angle and distance used in FIG. 6. In this Figure, Notch 1020 in 90 Degree Flange 805-B is illustrated. Notch 1020 has a length along element 1005 of Z, which, as illustrated, is 13/16", and a length along element 1010 which is at least length U which, as illustrated, is 1¼". In this Figure, Outside Panel 105-B is illustrated as comprising 90 Degree Flange 1015. As illustrated, 90 Degree Flange 1015 has a length along element 1025 of 7/16" or a length of ½" from the terminal edge of 90 Degree Flange 1015 to the outside face of Outside Panel 105-B.

Figure 11:
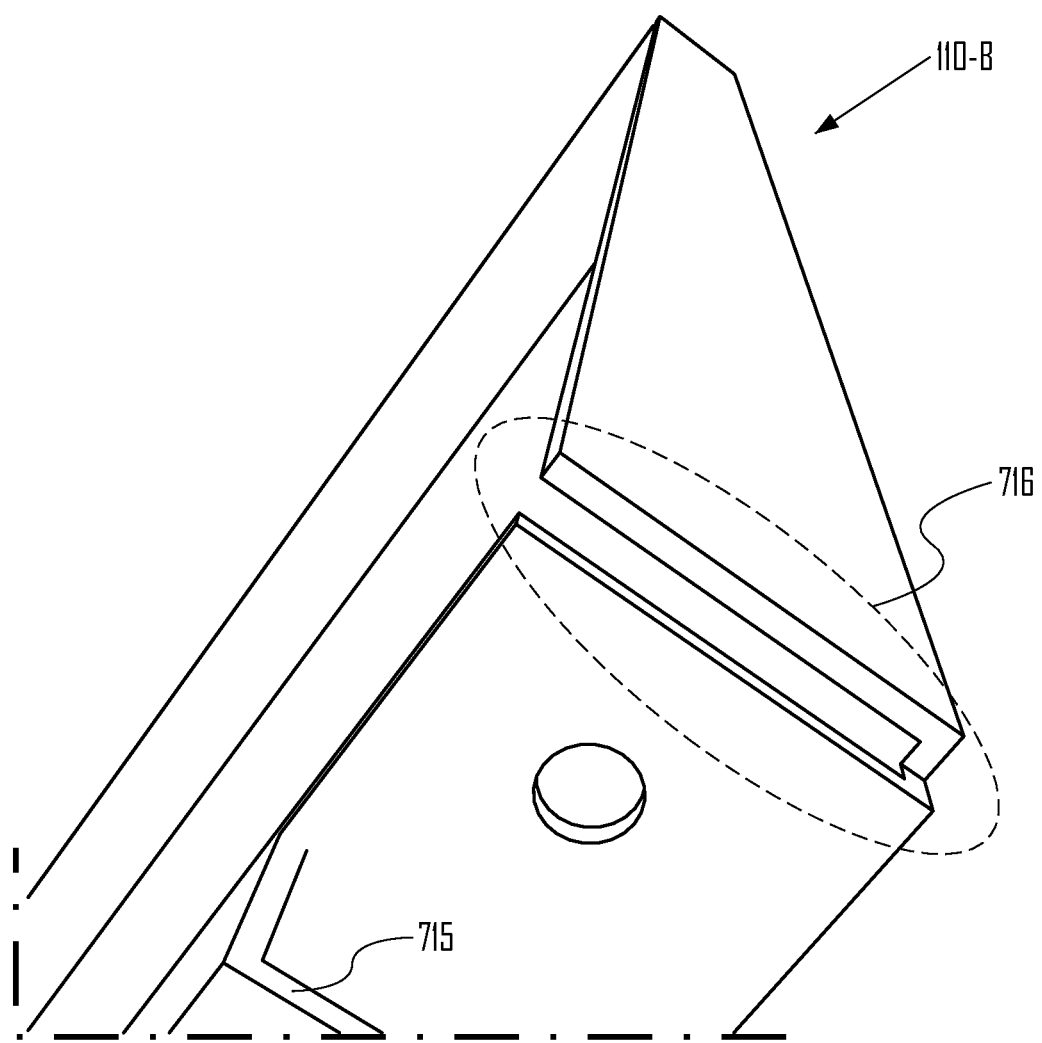
FIG. 11 is a close up perspective view of an illustration of an embodiment of the bottom of an Inside Panel of a Rectangular Planter, from the same view angle and distance used in FIG. 6.

FIG. 11 is a close up perspective view of an illustration of an embodiment of the bottom of an Inside Panel 105-B of a Rectangular Planter 100, from the same view angle and distance used in FIG. 6. FIG. 11 illustrates the Inside Panel 110-B without any other components, for the sake of completeness.

Figure 12:
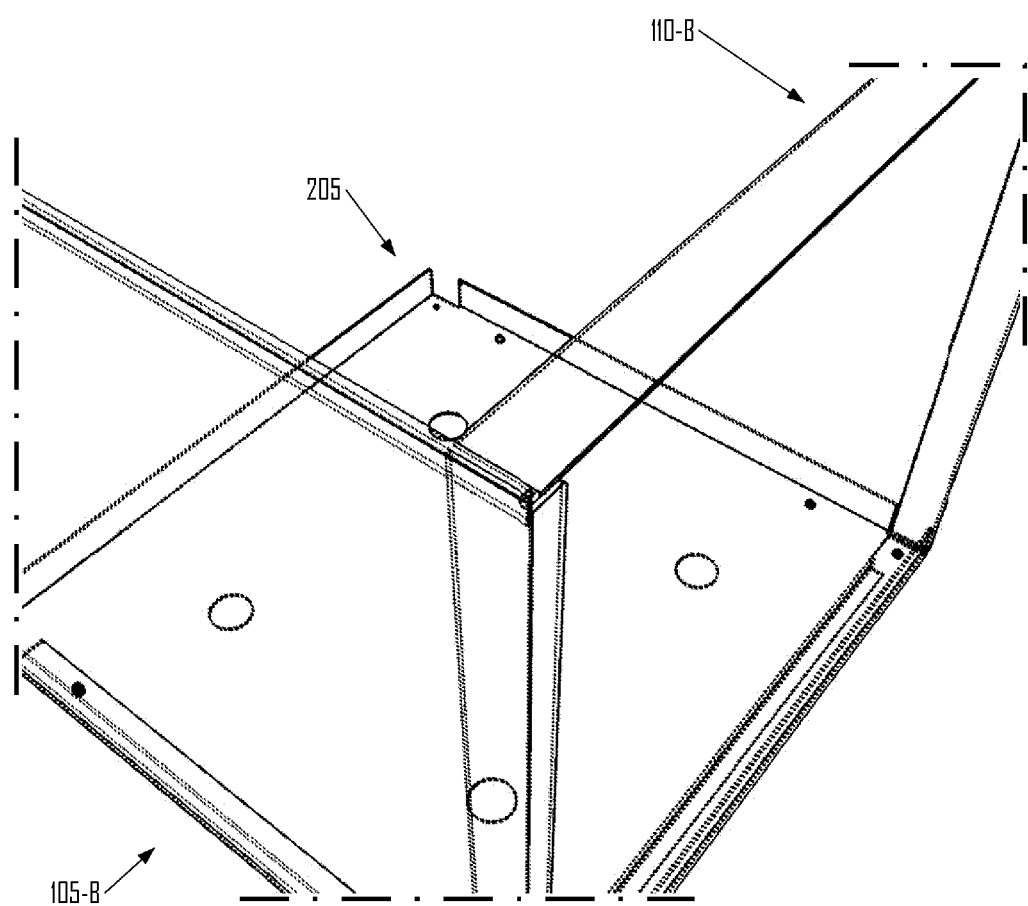
FIG. 12 is a close up perspective view of an embodiment of a top corner of a Rectangular Planter, illustrating intersection of an embodiment of an Outside Panel and an Inside Panel.
Figure 13:
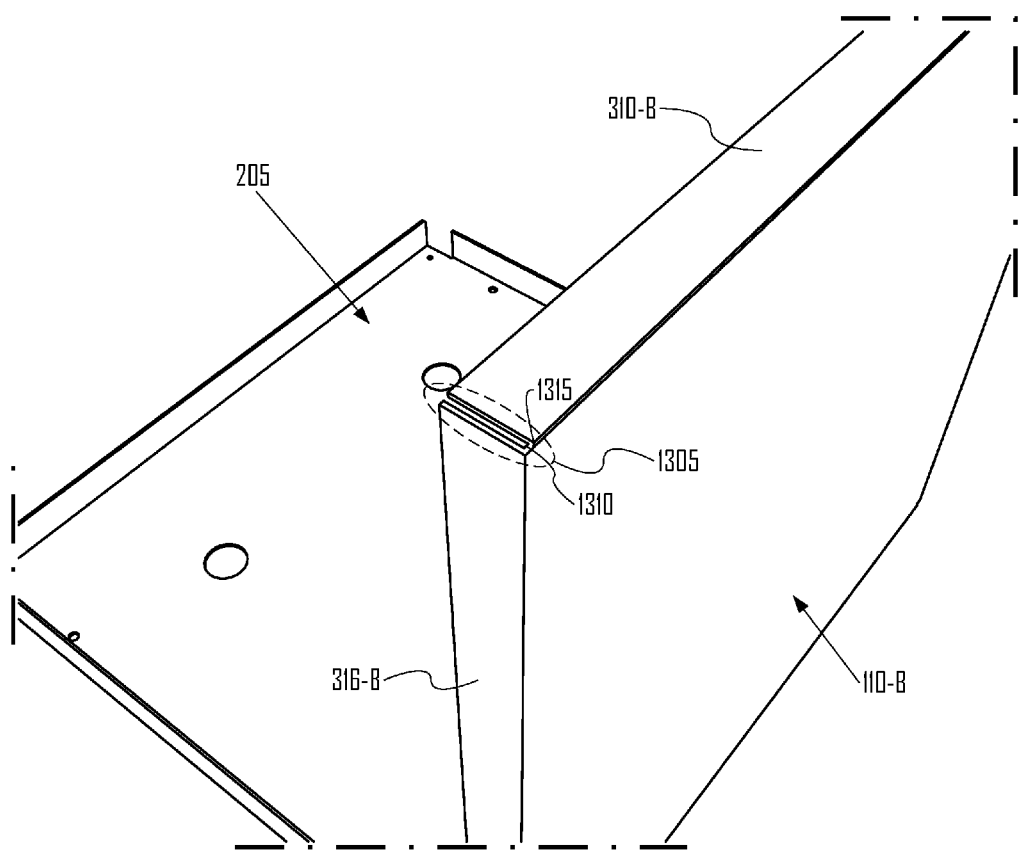
FIG. 13 is a close up perspective view of an embodiment of a top corner of a Rectangular Planter, illustrating an Inside Panel embodiment, from the same view angle and distance used in FIG. 12.
Figure 14:
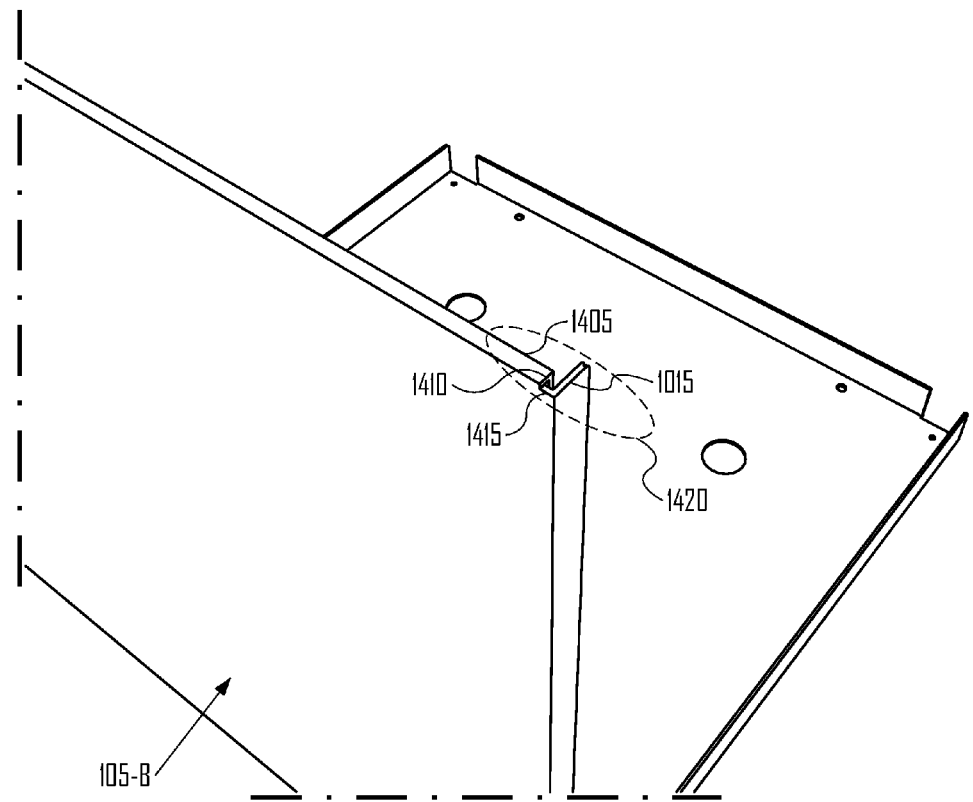
FIG. 14 close up is a perspective view of an embodiment of a top corner of a Rectangular Planter, illustrating an Outside Panel embodiment, from the same view angle and distance used in FIG. 12.

FIGS. 12-14 illustrate an embodiment of a top corner of a Rectangular Planter 100, illustrating the components together and in isolation.

FIG. 12 is a close up perspective view of an embodiment of an Outside Panel 105-B and an Inside Panel 110-B of a Rectangular Planter 100, with back lines illustrated with dotted lines.

FIG. 13 is a close up perspective view of an embodiment of a top corner of a Rectangular Planter 100, illustrating an Inside Panel 110-B embodiment, from the same view angle and distance used in FIG. 12. FIG. 13 illustrates that Inside Panel 110-B comprises 90 Degree Flanges 310-B and 316-B and Top Corner Notch 1305. FIG. 13 illustrates that Top Corner Notch 1305 is X along the y-axis, at element 1315, and 2× along the z-axis, at element 1310, with an interior opening, between the top of 90 Degree Flange 316-B and the edge of 90 Degree Flange 310-B, of at least X, also element 1310. Opening 1410 and 180 Degree Flange 1405 (see FIG. 14) engage with and rest on the top of 90 Degree Flange 316-B, supporting the weight of Outside Panel 105-B and preventing at least the top of Outside Panel 105-B from moving outward, away from the center of Rectangular Planter 100.

FIG. 14 is a close up perspective view of an embodiment of a top corner of a Rectangular Planter 100, illustrating an Outside Panel 105-B embodiment, from the same view angle and distance used in FIG. 12. FIG. 14 illustrates 180 Degree Flange 1405 which is spaced X away from Outside Panel 105-B, illustrated at Opening 1410. As discussed above, FIG. 14 illustrates Corner Notch 1420, which Corner Notch 1420 extends 2× along the x-axis (at element 1415) and X along the y-axis from the top corner of Outside Panel 105-B in FIG. 14. Opening 1410 and 180 Degree Flange 1405 engage with and rest on the top of 90 Degree Flange 316-B.

Figure 15A:
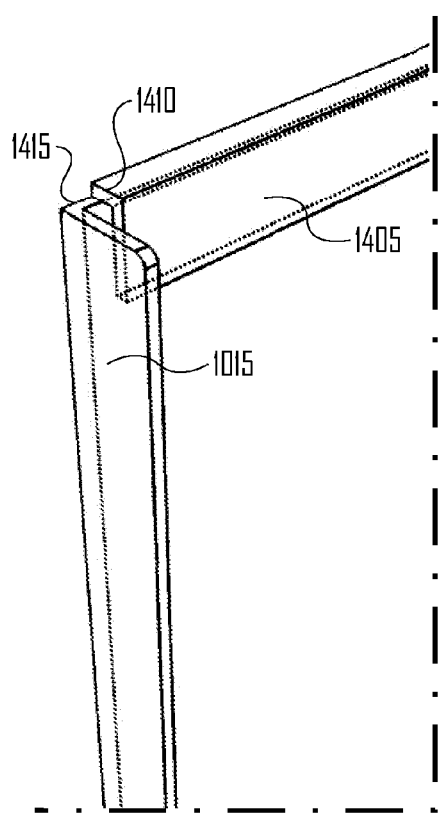
FIGS. 15A and 15B are close up perspective views of an embodiment of an Outside Panel of a Rectangular Planter, from different view angles.
Figure 15B:
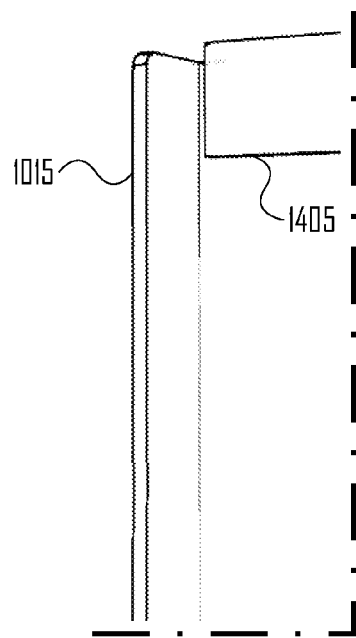

FIGS. 15A and 15B are close up perspective views of an embodiment of an Outside Panel 105-B of a Rectangular Planter 100, from different view angles. FIGS. 15A and 15B are provided for the purpose of completeness. As illustrated, 180 Degree Flange 1405 has a length FF (along the y-axis) of between ¼" and ¾" (illustrated as ¹⁵⁄₃₂").

Figure 16:
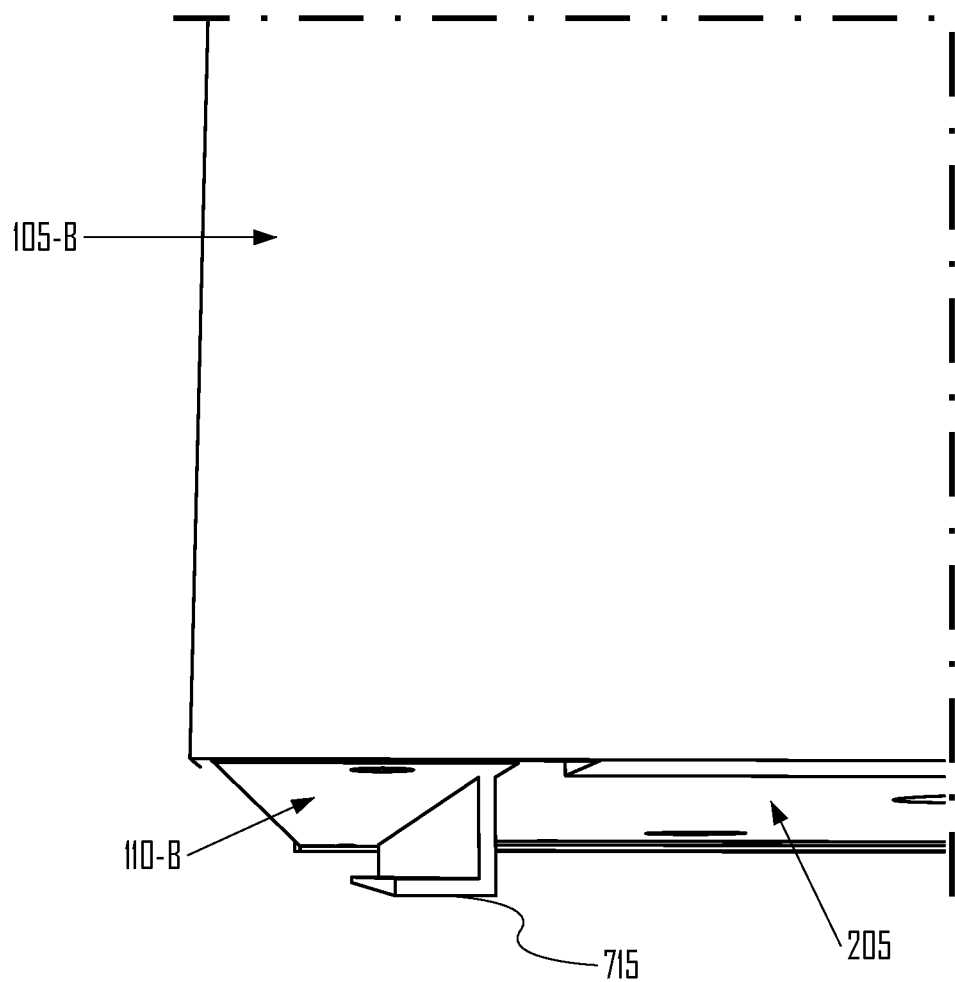
FIG. 16 is a close up perspective view of an embodiment of an Outside Panel, an Inside Panel, and a Base of a Rectangular Planter.

FIG. 16 is a close up perspective view of an embodiment of an Outside Panel 105-B, an Inside Panel 110-B, and a Base 205 of a Rectangular Planter 100. FIG. 16 illustrates Foot 715, which is a component of Inside Panel 110-B. Foot 715 may have a different size and proportions, other than as illustrated.

During assembly, screws or other fasteners may be secured in Holes 235 and 240. However, because Base 205 is resting on the Inside Panels 110, and because the weight of the Outside Panels 105 is transferred onto the Inside Panels 110, the only static strain on the screws or fasteners in Holes 235 and 240 comes from the outward pressure of the dirt on the bottom of the Outside Panels 105. The screws or other fasteners may be stainless steel, weathering steel, galvanized iron, copper, brass, aluminum, an alloy, plastic, or the like.

Figure 17:
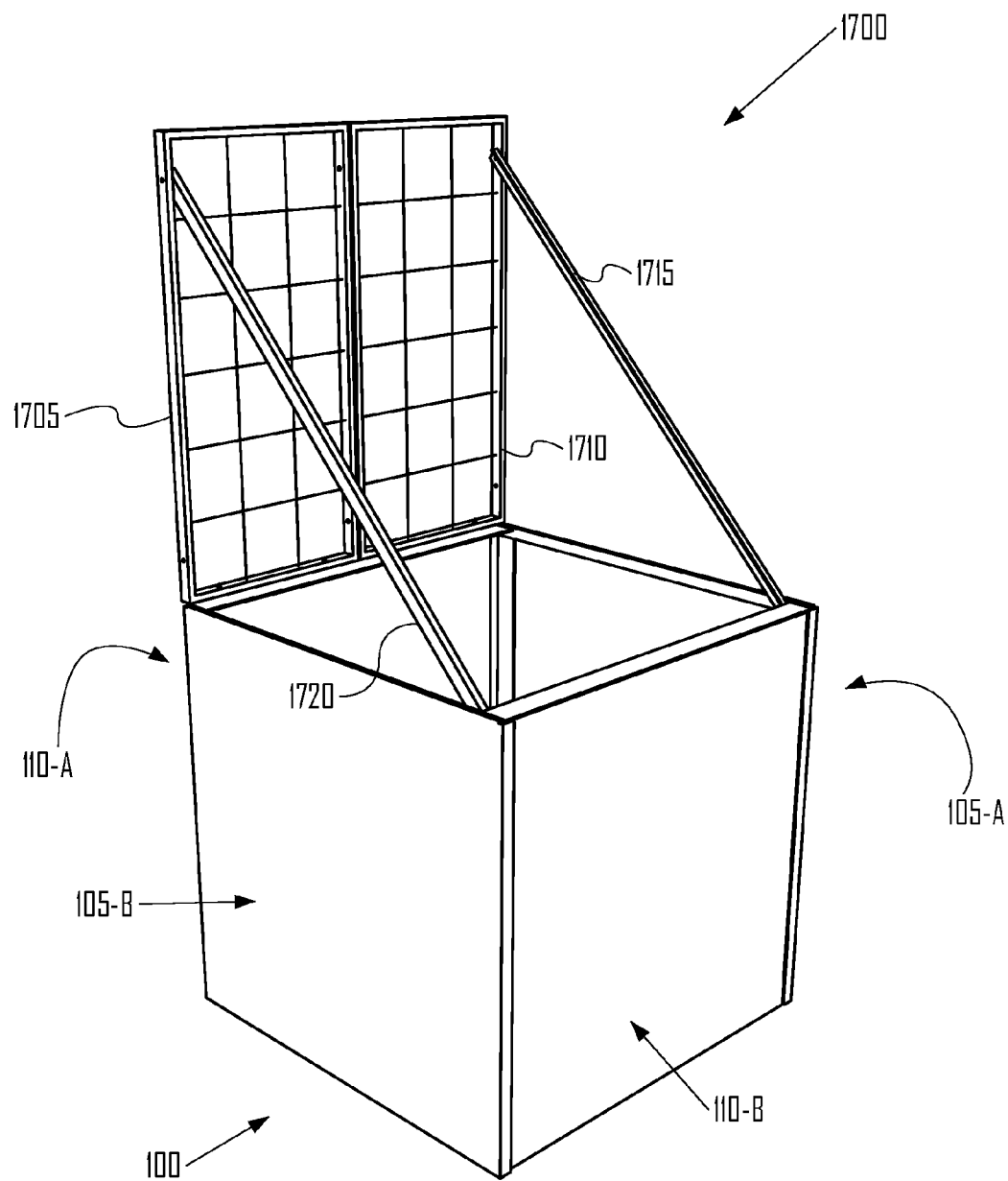
FIG. 17 is a perspective view of an embodiment of a Rectangular Planter and a Trellis.

FIG. 17 is a perspective view of an embodiment of a Rectangular Planter and a Trellis 1700. The Trellis 1700 comprises two similar Panes 1705 and 1710. The Panes 1705 and 1710 may be bolted or otherwise secured to the top of Inside Panel 110-A. The Trellis 1700 may comprise Arms 1715 and 1720, which may be bolted or otherwise secured to Panes 1705 and 1710 and to the Rectangular Planter 100, such as to the Outside Panel 105-A and 105-B.

Figure 18:
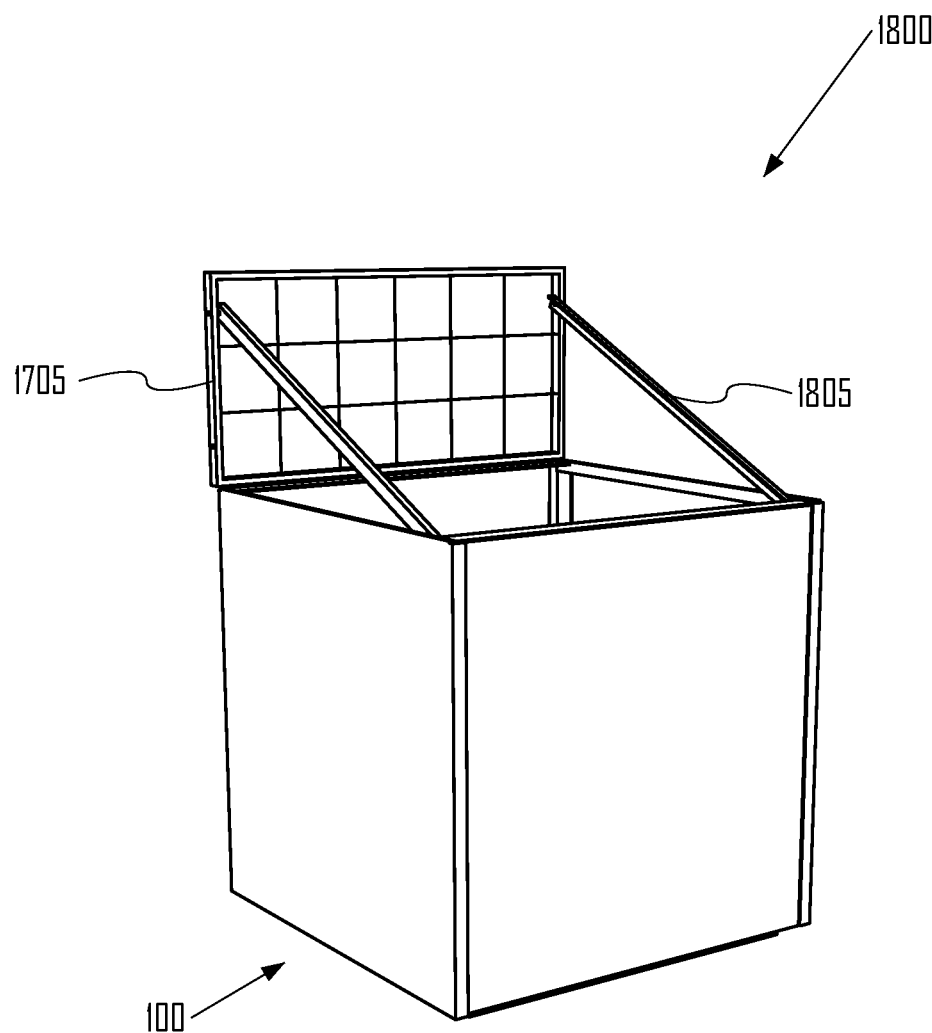
FIG. 18 is a perspective view of an embodiment of a Rectangular Planter and a Trellis.

FIG. 18 is a perspective view of an embodiment of a Rectangular Planter and a Trellis 1800. In this Figure, Pane 1705 has a horizontal attitude and is secured to Rectangular Planter 100 by Arms 1805.

Figure 19:
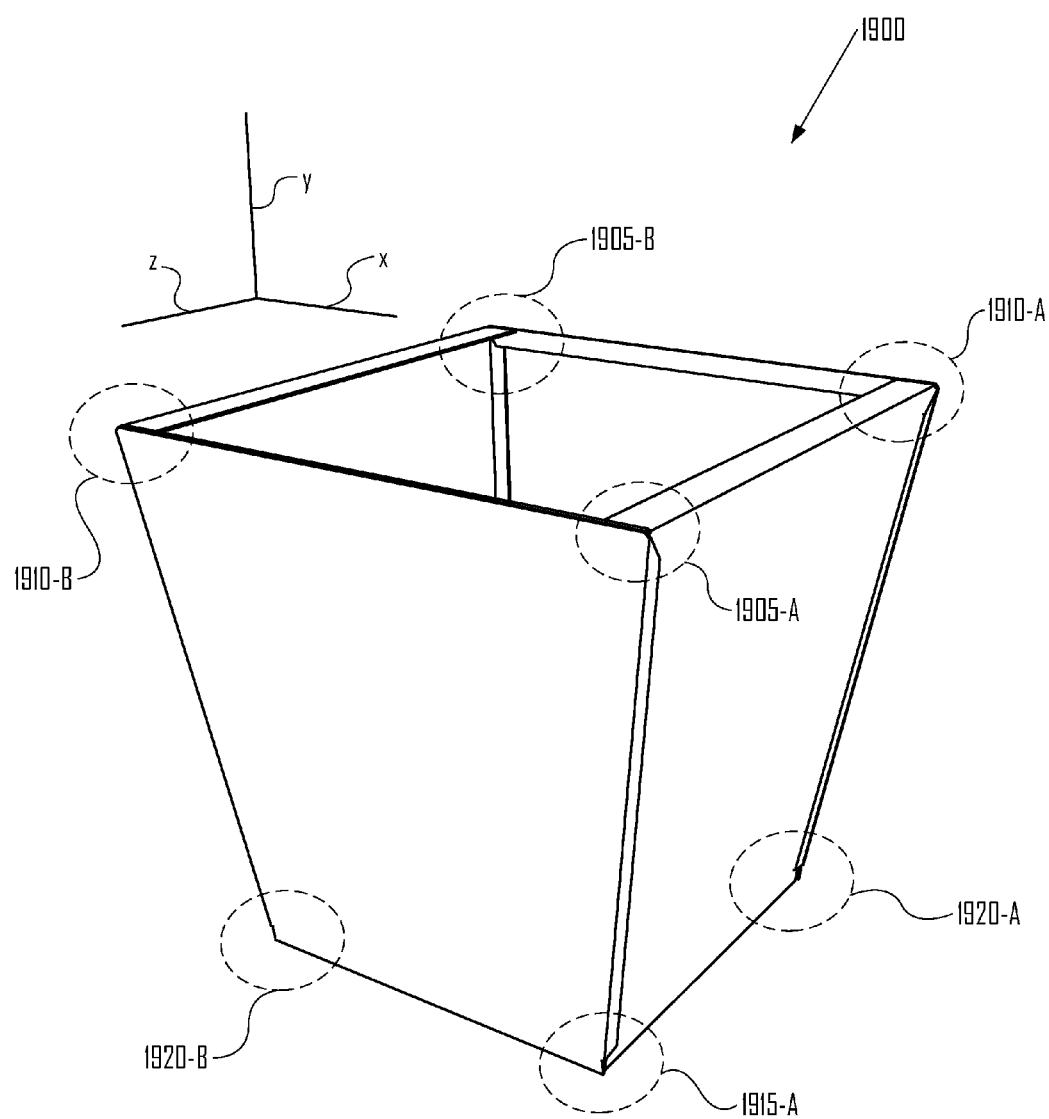
FIG. 19 is a perspective view of an embodiment of a Vase Planter.

FIG. 19 is a perspective view of an embodiment of a Vase Planter 1900. The Vase Planter 1900 is illustrated as comprising Corners 1905-A, 1910-A, 1915-A, and 1920-A, as well as substantially similar counterpart Corners, rotated 180 degrees, 1905-B, 1910-B, 1915-B, and 1920-B. The Vase Planter 1900 is a sheet metal structure, wherein the sheet metal has a uniform thickness, X (the thickness, X, and the material of the sheet metal is discussed above). Much as above, relating to the Rectangular Planter 100, the Vase Planter 1900 may be lengthened along the x- and z-axes by lengthening these sides, generally preserving the angular relationship of the sides, corners, and notches; the Vase Planter 1900 may also be lengthened along the y-axis, again, generally preserving the angular relationship of the sides.

Figure 20:
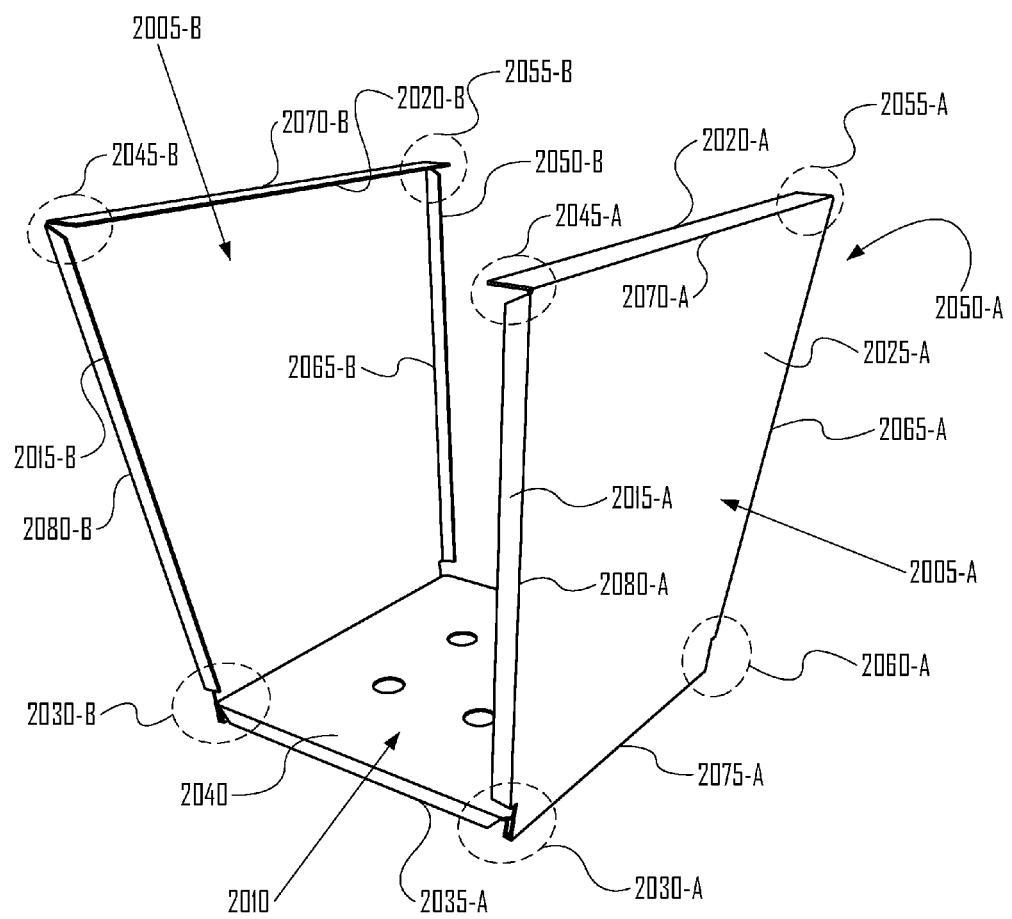
FIG. 20 is a perspective view of an embodiment of a Base and an Inside Panel of a Vase Planter, from the same view angle and distance used in FIG. 19.

FIG. 20 is a perspective view of an embodiment of a Base 2010 and an Inside Panel 2005-A of a Vase Planter 1900, from the same view angle and distance used in FIG. 19. FIG. 20 illustrates Inside Panels 2005-A and 2005-B. Inside Panel 2005 comprises Edges 2065, 2070, 2075, and 2080. Edges 2065 and 2080 are predominantly on the y-axis, while Edges 2070 and 2075 are on the z-axis. Top Edge 2070 is attached to Greater-Than-90 Degree Flange 2020 of length A (relative to top Edge 2070), which, as illustrated, is 1⅛". Side Edge 2080 is attached to 90 Degree Flange 2015 of length T, which, as illustrated, is ⅝" (also illustrated at element 2920 in FIG. 29), not shown, side Edge 2065-A is attached 90 Degree Flange 2050-A (corresponding to 2050-B), also of length T, and bottom Edge 2075-A is attached to 180 Degree Flange 2910 (see FIG. 29).

FIG. 20 further illustrates Base 2010 comprising 90 Degree Flange 2035-A and, not shown, 2155-A (see FIG. 21 for an illustration of 90 Degree Flange 2155-A), and corresponding Flanges 2035-B and 2155-B.

Figure 21:
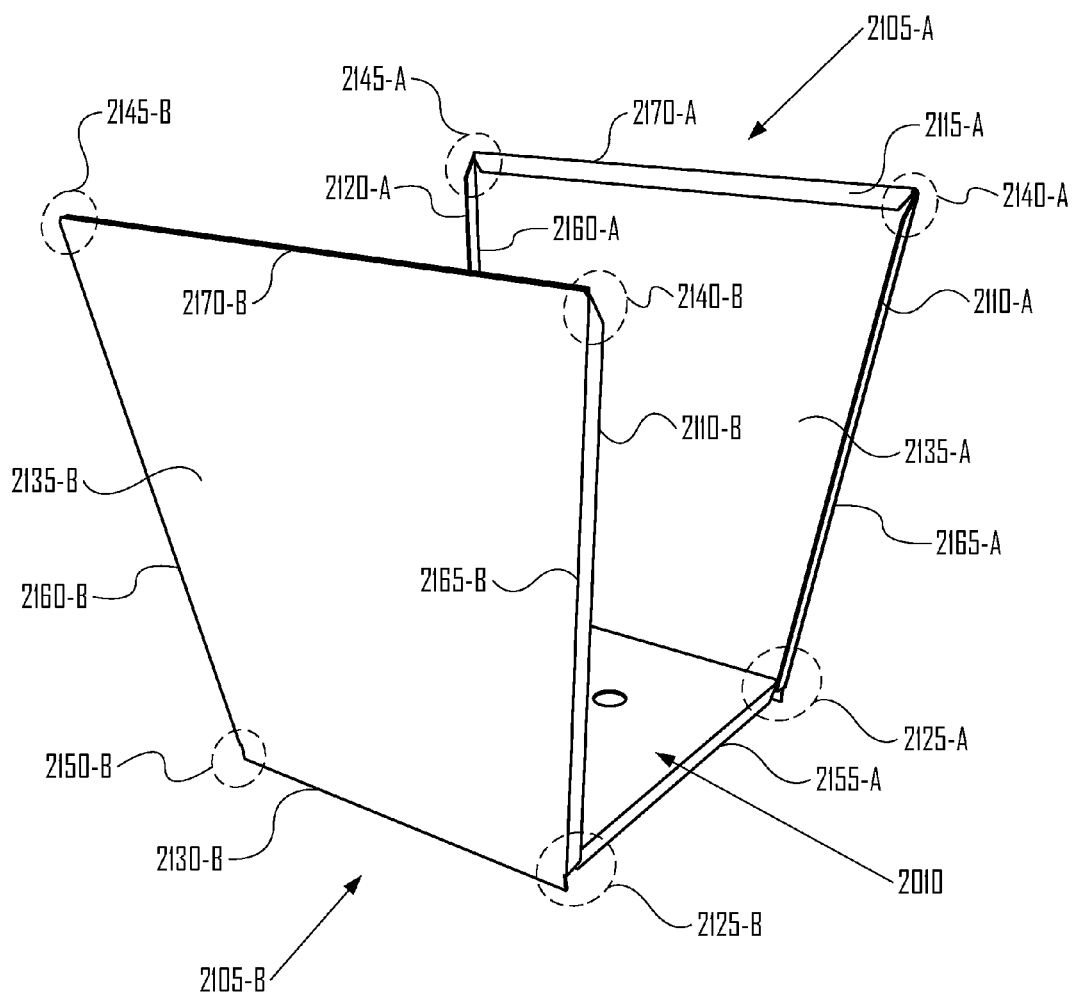
FIG. 21 is a perspective view of an embodiment of an Outside Panel of a Vase Planter, from the same view angle and distance used in FIG. 19.

FIG. 21 is a perspective view of an embodiment of an Outside Panel 2105 of a Vase Planter 1900, from the same view angle and distance used in FIG. 19. FIG. 21 illustrates Outside Panels 2105-A and 2105-B, each comprising Edges 2130, 2160, 2165, and 2170, Face 2135, predominantly vertical 90 Degree Flanges 2110 and 2120 of length S, which, as illustrated, is ½", and 180 Degree Flange 2115.

FIG. 21 also illustrates Corner Notches 2125-A, 2125-B, 2140-A, 2140-B, 2145-A, 2145-B, and 2150-B, described further below.

Figure 22:
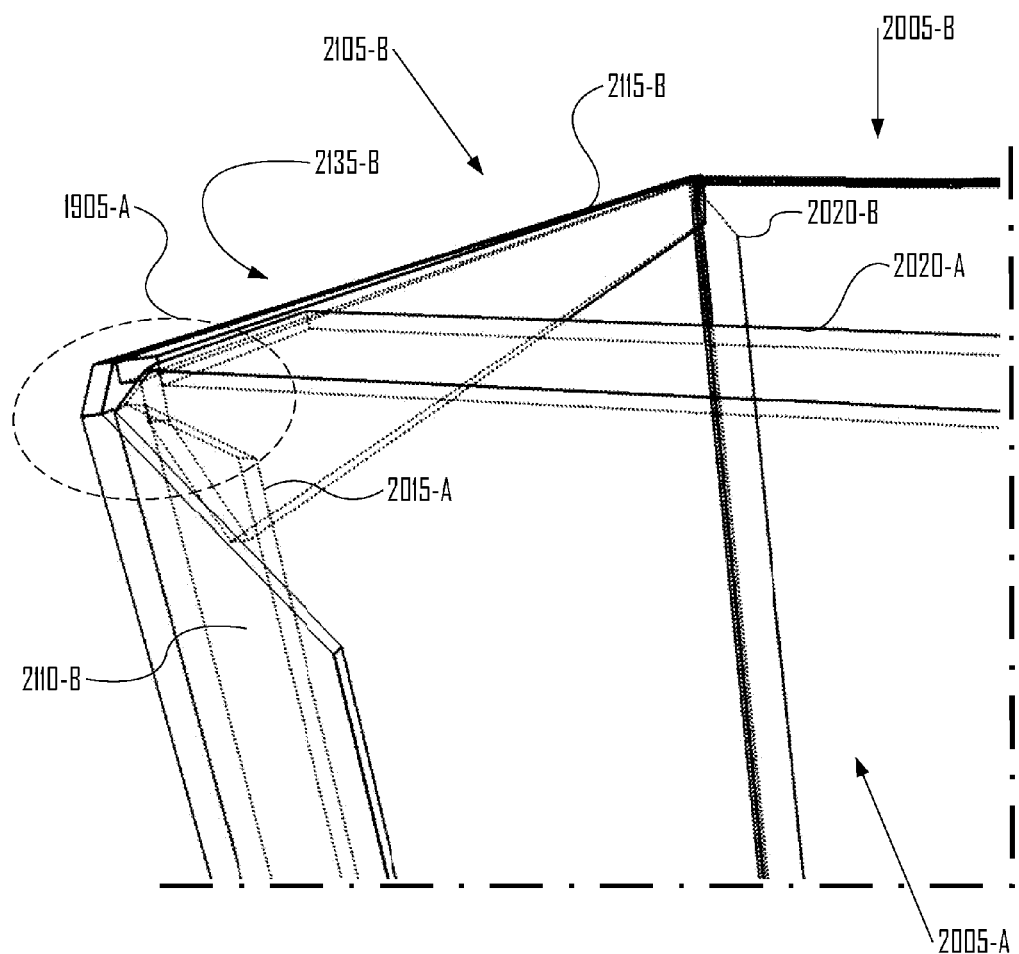
FIG. 22 is a close up perspective view of an embodiment of a top corner of an Outside Panel and an Inside Panel of a Vase Planter.

FIG. 22 is a close up perspective view of an embodiment of a top corner of an Outside Panel 2105-B and Inside Panels 2005 of a Vase Planter 1900. FIG. 22 illustrates that Outside Panel 2105-B receives, between 90 Degree Flanges 2110-B and 2110-A, the Inside Panels 2005-A and 2005-B. At Corner 1905-A, 180 Degree Flange 2115-B in the Outside Panel 2105-B engages with 90 Degree Flange 2015-A of the Inside Panel 2005-A, preventing at least the top of Outside Panel 2105 from moving outward, away from the center of Vase 1900.

Figure 23:
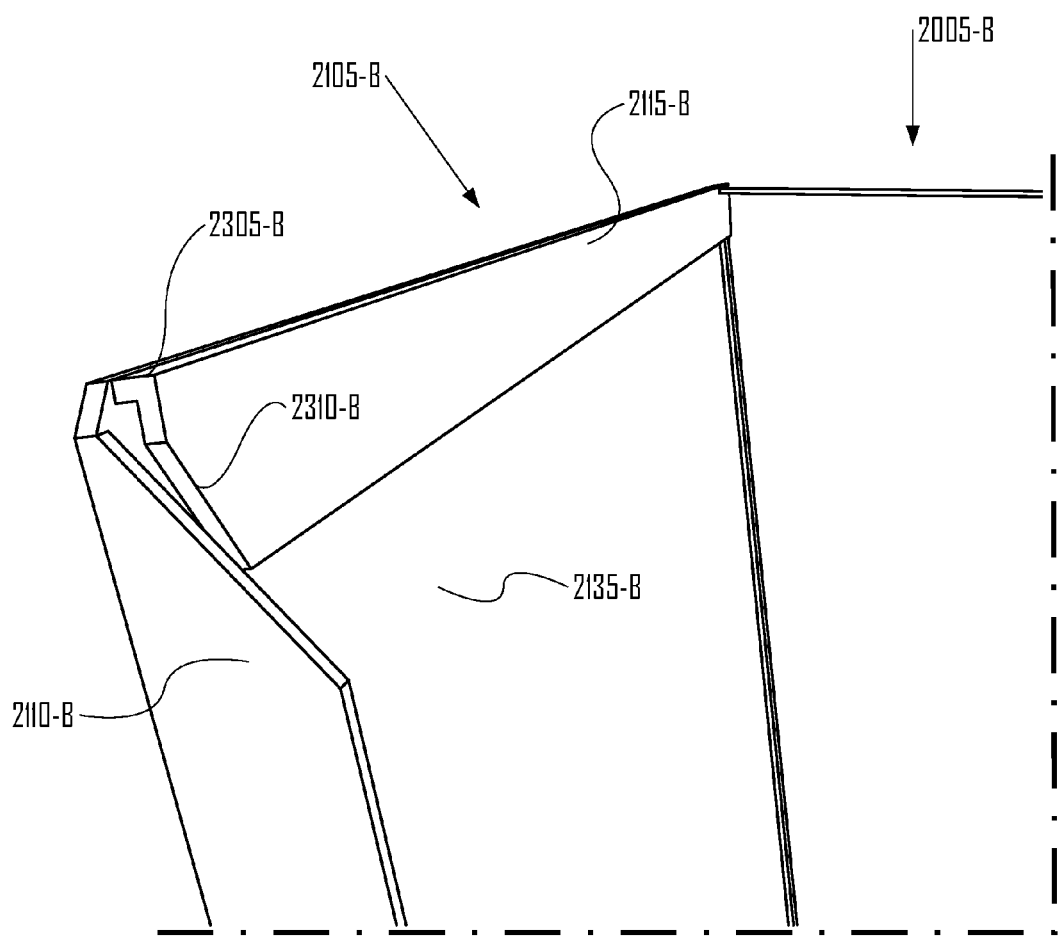
FIG. 23 is a close up perspective view of an embodiment of an Outside Panel of a Vase Planter, from the same view angle and distance used in FIG. 22.

FIG. 23 is a close up perspective view of an embodiment of an Outside Panel 2105-B of a Vase Planter 1900, from the same view angle and distance used in FIG. 22. FIG. 23 illustrates the components of Outside Panel 2105-B. FIG. 23 illustrates that 180 Flange 2115-B is set off from Face 2135-B by a distance of 2×, as labeled at element 2305, also referred to herein as Opening 2305-B. FIG. 23 also illustrates Chamfer 2310-B, which facilitates assembly of 180 Degree Flange 2115-B onto 90 Degree Flange 2015-A. 180 Degree Flange 2115-B is set off from 90 Degree Flange 2110-B by a distance of 2× (see FIG. 26 and element 2605), which, due to the thickness X of 90 Degree Flange 2110-B, leaves an opening at least X wide between 180 Degree Flange 2115-B and 90 Degree Flange 2110-B, into which Face 2025 fits, allowing 90 Degree Flange 2015-A to pass between 180 Flange 2115-B and Face 2135-B.

Figure 24:
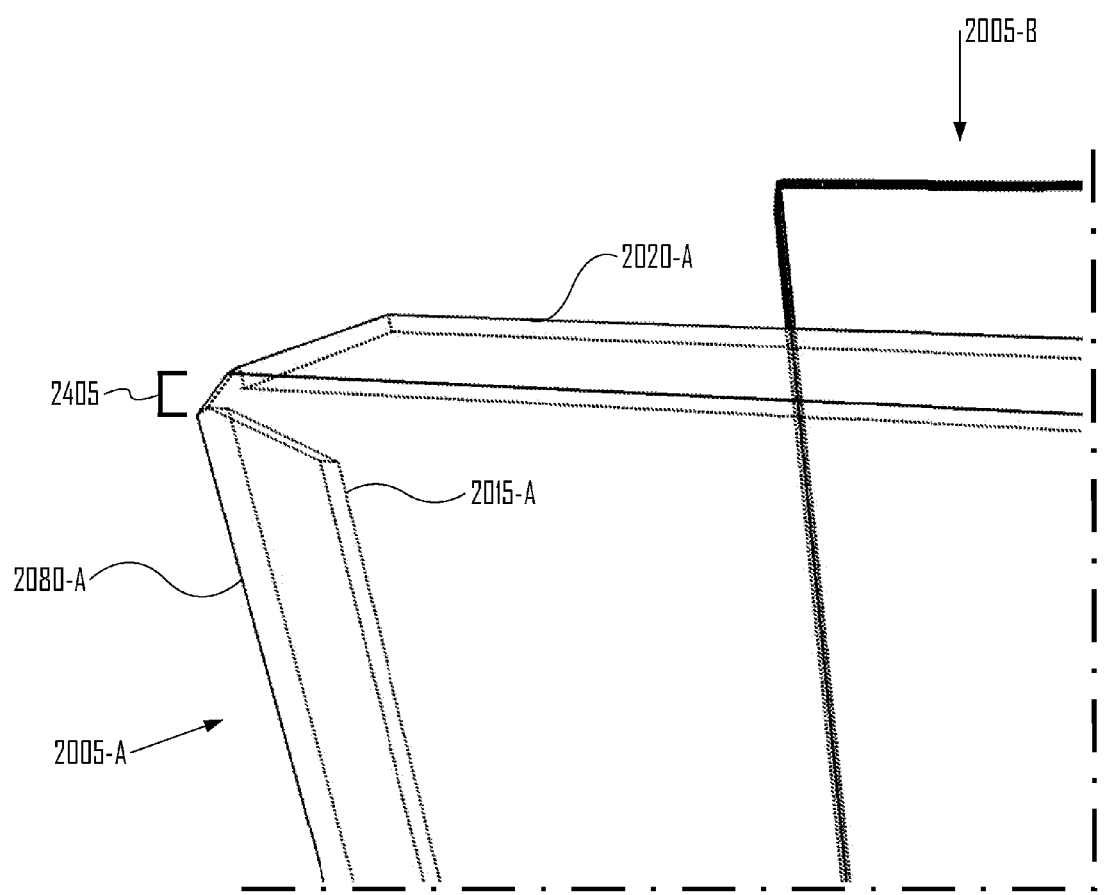
FIG. 24 is a close up perspective view of an embodiment of an Inside Panel of a Vase Planter, from the same view angle and distance used in FIG. 22.

FIG. 24 is a close up perspective view of an embodiment of an Inside Panel 2005-A of a Vase Planter 1900, from the same view angle and distance used in FIG. 22. FIG. 24 illustrates length 2405, which is 2× along the (predominantly) y-axis of Edge 2080-A.

Figure 25:
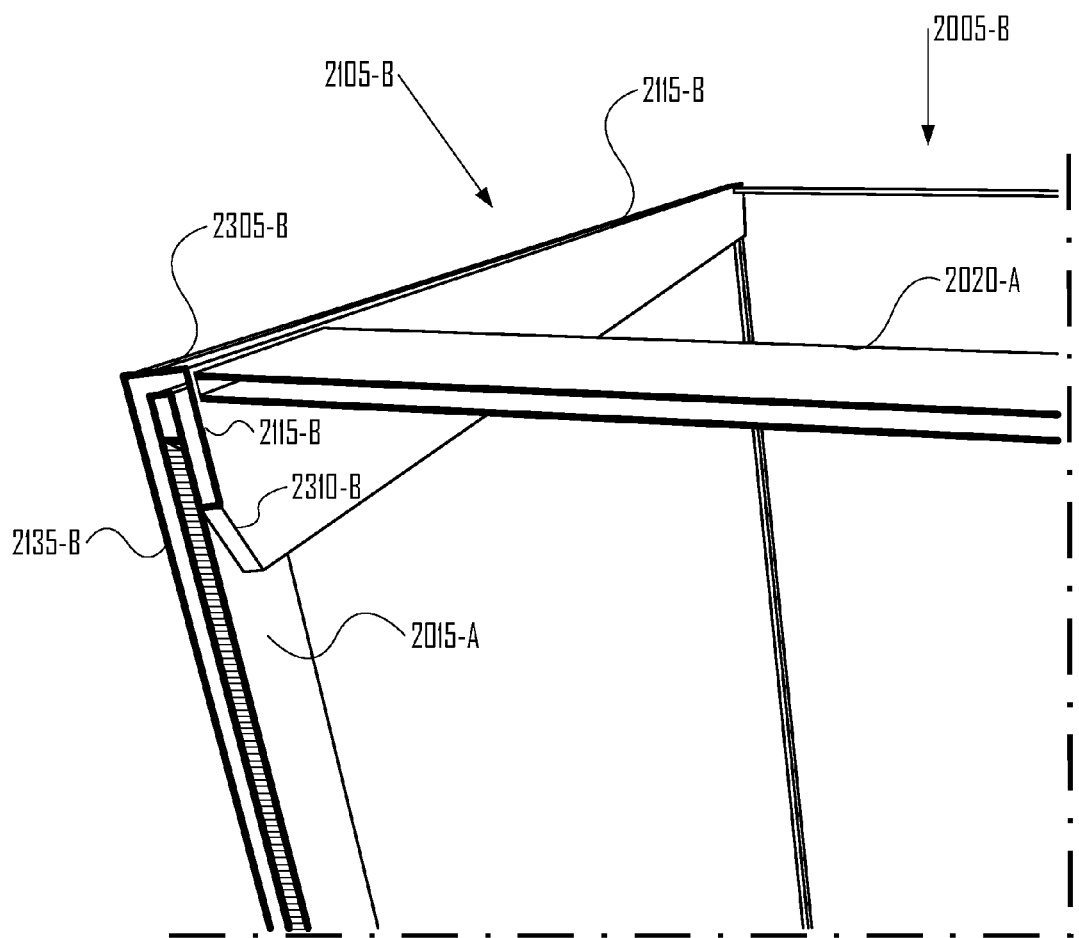
FIG. 25 is a close up perspective section view of an embodiment of an Outside Panel and an Inside Panel of a Vase Planter, from the same view angle and distance used in FIG. 22.

FIG. 25 is a perspective section view of an embodiment of an Outside Panel 2105-B and an Inside Panel 2005-B of a Vase Planter 1900, from the same view angle and distance used in FIG. 22. The section view in FIG. 25 further illustrates how 90 Degree Flange 2015-A fits within the opening between 180 Degree Flange 2115-B and Face 2135-B and how Greater-Than 90 Degree Flange 2020-A abuts against 180 Degree Flange 2115-B. The interior of 90 Degree Flange 2015-A is lined, to distinguish it from the interior of Face 2135-B and 180 Degree Flange 2115-B.

Figure 26:
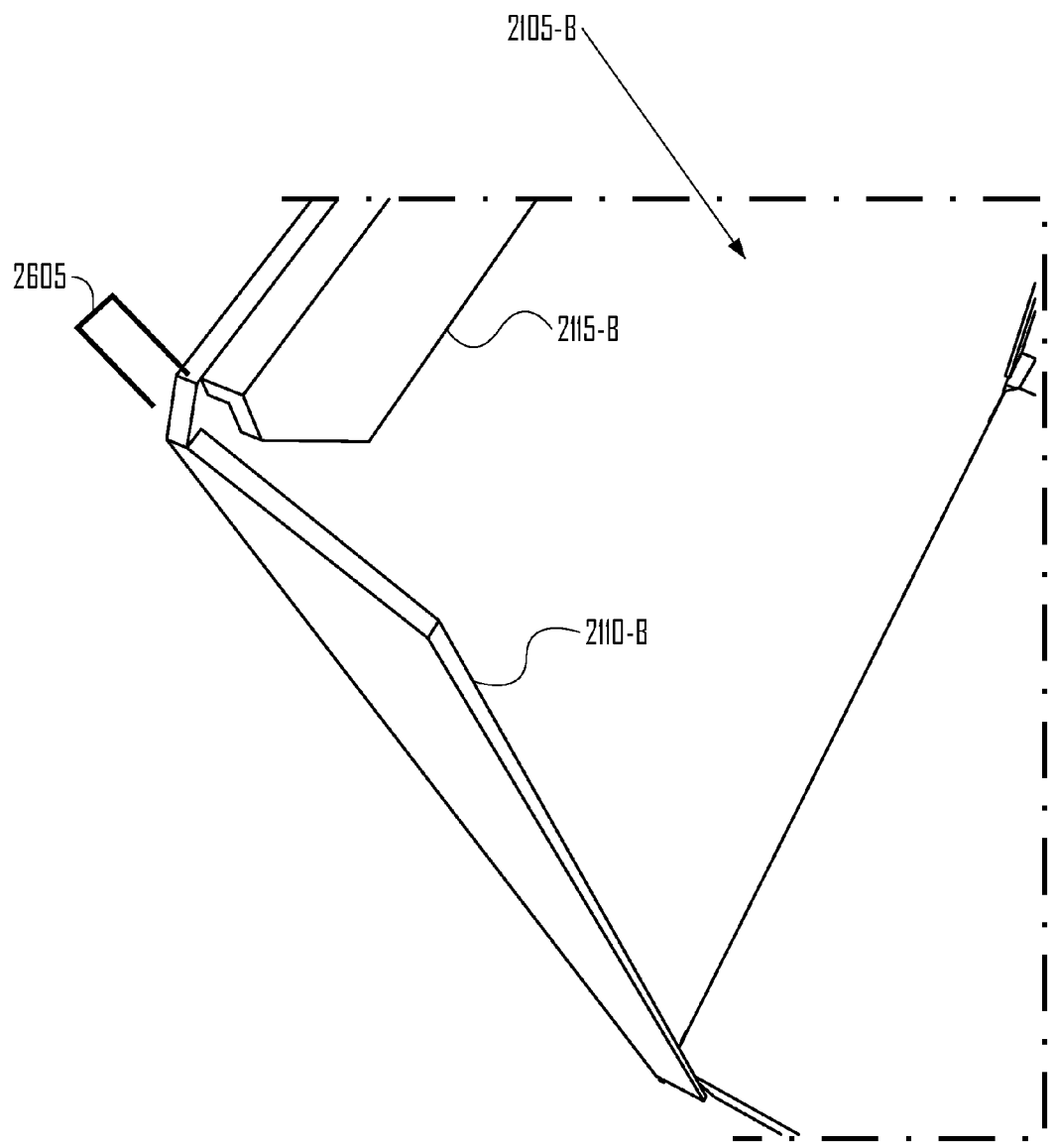
FIG. 26 is a close up perspective view of an embodiment of an Outside Panel of a Vase Planter.

FIG. 26 is a close up perspective view of an embodiment of an Outside Panel 2105-B of a Vase Planter 1900. At element 2605, this Figure illustrates that 180 Degree Flange 2115-B is approximately distance 2× from 90 Degree Flange 2110-B, measured from the top corner in FIG. 26, with approximately X between 180 Degree Flange 2115-B and 90 Degree Flange 2110-B.

Figure 27:
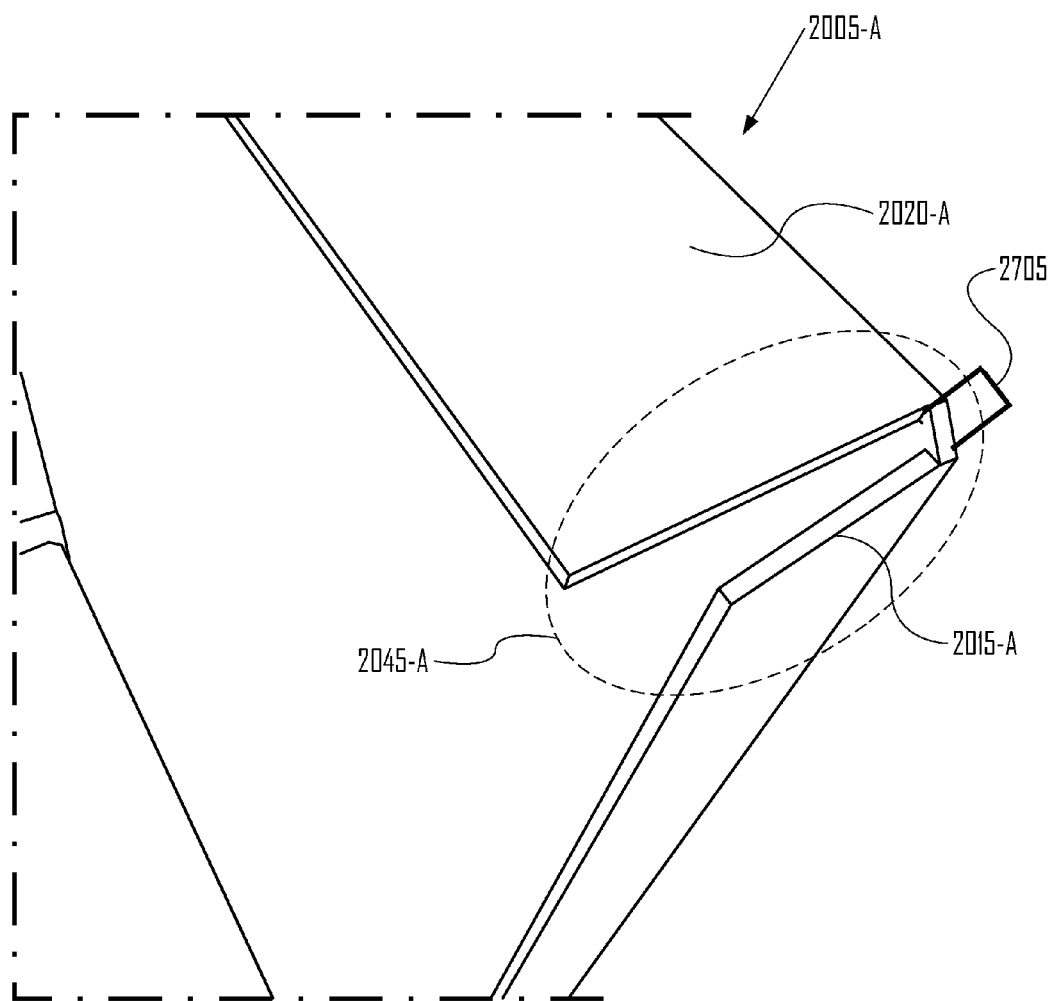
FIG. 27 is a close up perspective view of an embodiment of an Inside Panel of a Vase Planter.

FIG. 27 is a close up perspective view of an embodiment of an Inside Panel 2005-A of a Vase Planter 1900. This Figure illustrates at element 2705 that Greater-Than 90 Degree Flange 2020-A is set back 2× from the top corner of Inside Panel 2005-A, which, due to the width X of 90 Degree Flange 2015-A, leaves an opening X wide between Greater-Than 90 Degree Flange 2020-A and 90 Degree Flange 2015-A.

Figure 28:
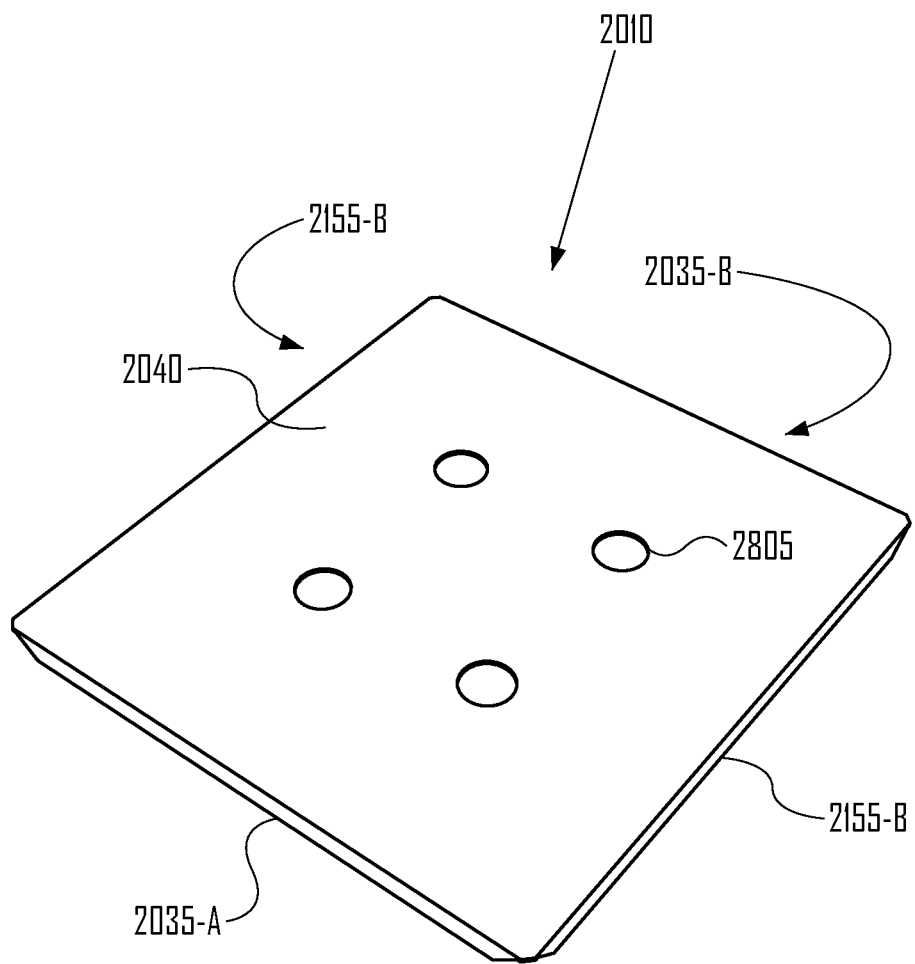
FIG. 28 is a perspective view of an embodiment of a Base of a Vase Planter.

FIG. 28 is a perspective view of an embodiment of a Base 2010 of a Vase Planter 1900. This Figure illustrates Drain Hole 2805.

Figure 29:
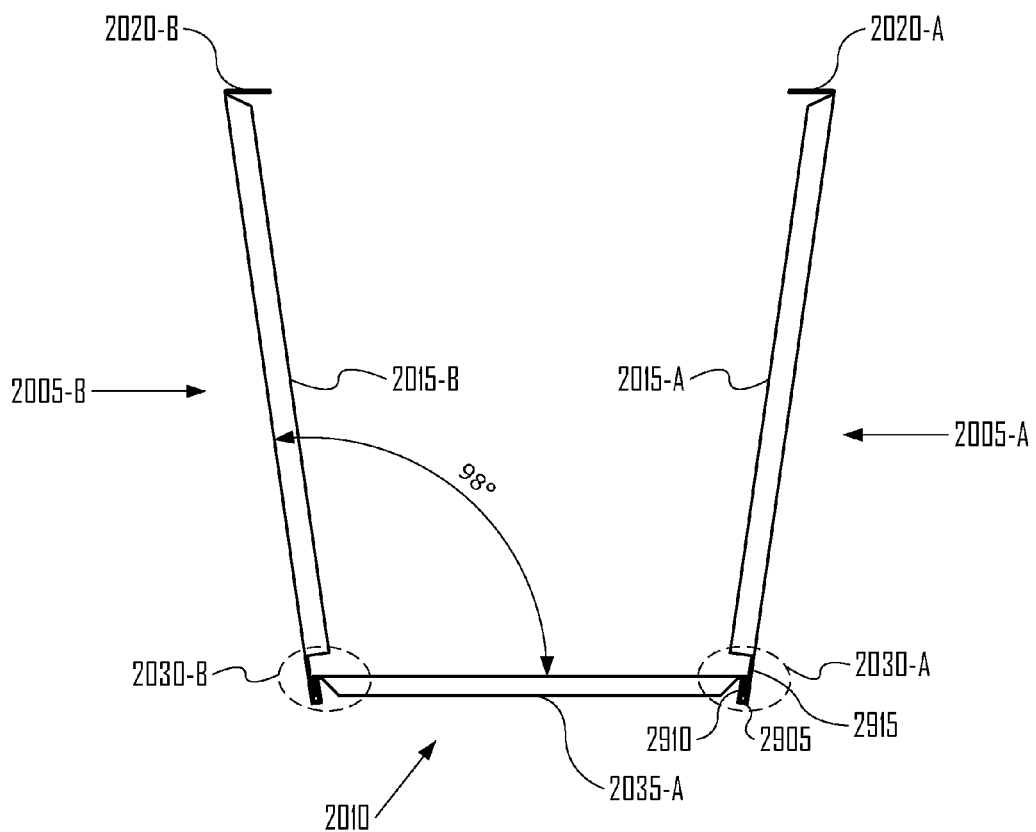
FIG. 29 is an elevation view of an embodiment of a Base and an Inside Panel of a Vase Planter.

FIG. 29 is an elevation view of an embodiment of a Base 2010 and an Inside Panels 2005 of a 1900. Vase Planter. This Figure illustrates Corner Notch 2030-A comprising length R at element 2915 (illustrated as 1¼"), length Q at element 2905 (illustrated as ¼" on the outside, ⅛" on the inside), and 180 Flange 1910-A, forming an opening ⅛" wide between 180 Degree Flange 2910 and Face 2025-A, into which opening 90 Degree Flange 2155 in Base 2010 fits, thereby preventing the base of Inside Panel 2005-A and 2005-B from moving outward, away from the center of Vase 1900.

FIG. 29 further illustrates that the angle between Base 2010 and the Inside Panels 2005 is an angle greater than 90 degrees, here, as illustrated, approximately 98 degrees. These angles are approximate.

Figure 30:
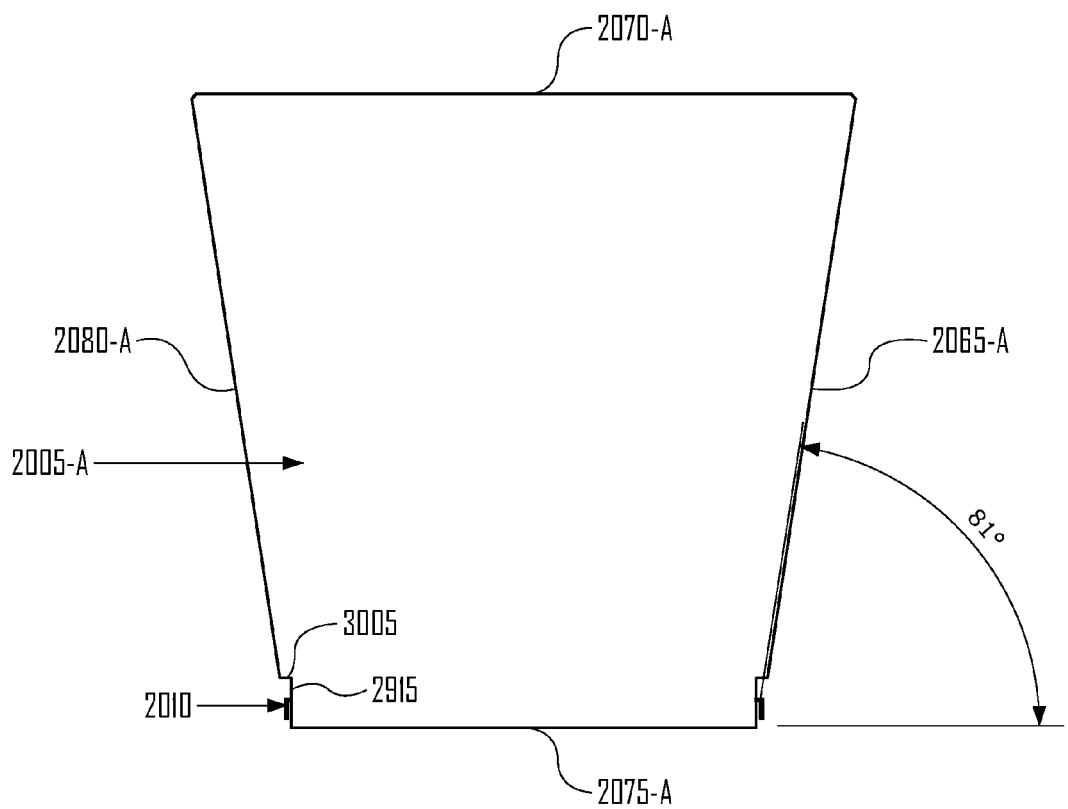
FIG. 30 is an elevation view of an embodiment of a Base and an Inside Panel of a Vase Planter, with the view angle rotated 90 degrees relative to FIG. 29.

FIG. 30 is an elevation view of an embodiment of a Base 2010 and an Inside Panel 2005-A of a Vase Planter 1900, with the view angle rotated 90 degrees relative to FIG. 29. This Figure is provided for the sake of completeness. This Figure illustrates the angle less than 90 degrees between the Edge 2065-A and a horizontal surface, here, as illustrated, approximately 81 degrees. These angles are approximate.

Figure 31:
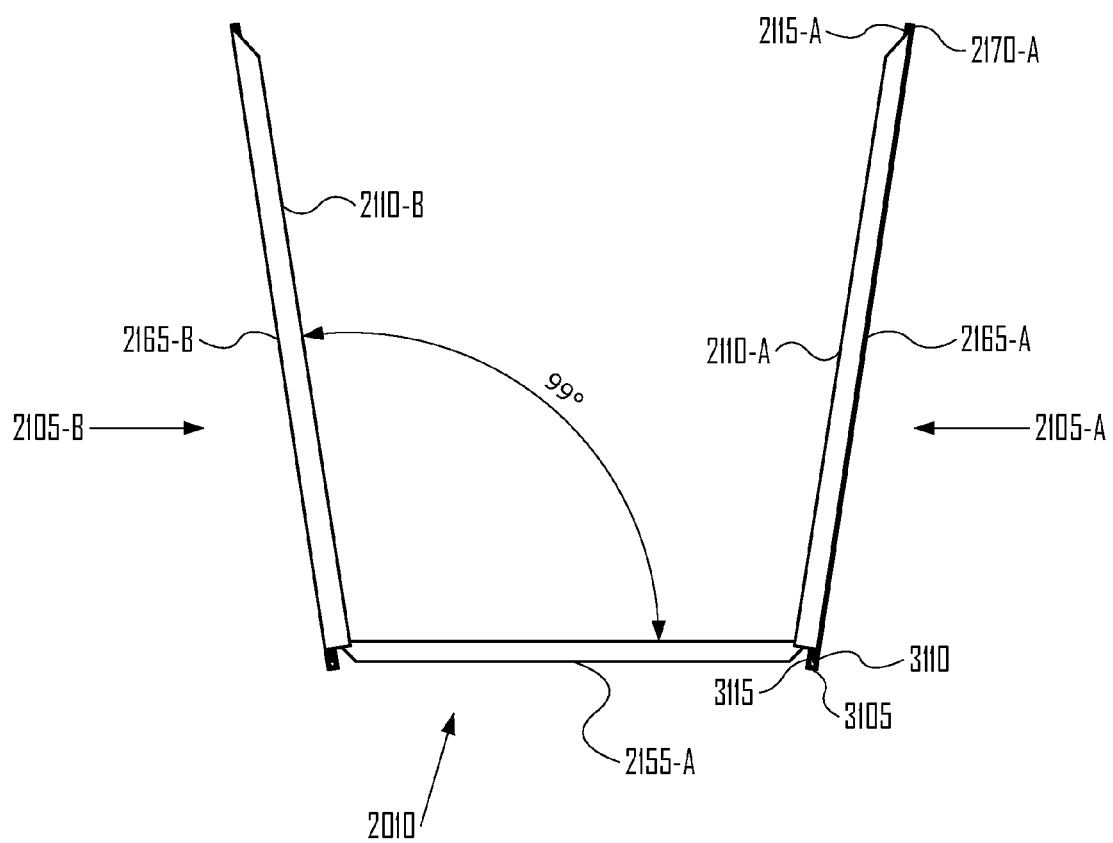
FIG. 31 is an elevation view of an embodiment of a Base and an Outside Panel of a Vase Planter.

FIG. 31 is an elevation view of an embodiment of a Base 2010 and an Outside Panel 2105 of a Vase Planter 1900. This Figure illustrates Inside Panels 2105-A and 2105-B, Length 3110 (illustrated as ½"), 3105 (illustrated as ¼"), and 180 Degree Flange 3115, forming an opening between 180 Degree Flange 3115 and Face 2135, into which 90 Degree Flange 2035 on Base 2010 fits, preventing the outward movement of Outside Panel 2105, away from the center of Vase 1900.

FIG. 31 further illustrates that the angle between Base 2010 and Outside Panel 2105-B is an angle greater than 90 degrees, here, as illustrated, approximately 99 degrees.

Figure 32:
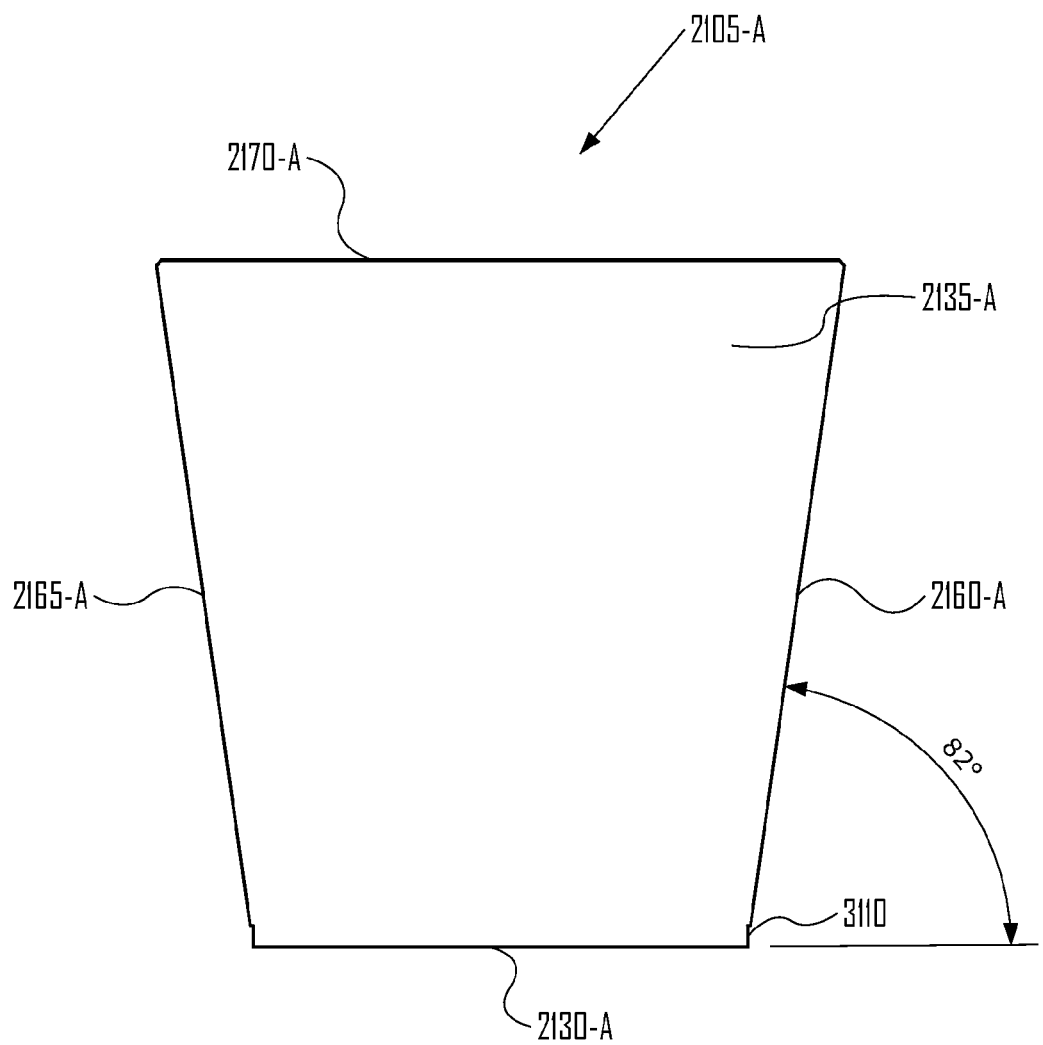
FIG. 32 is an elevation view of an embodiment of an Outside Panel of a Vase Planter, rotated 90 degrees relative to FIG. 31.

FIG. 32 is an elevation view of an embodiment of an Outside Panel 2105-A of a Vase Planter 1900, rotated 90 degrees relative to FIG. 31. This Figure is provided for the sake of completeness.

Figure 33:
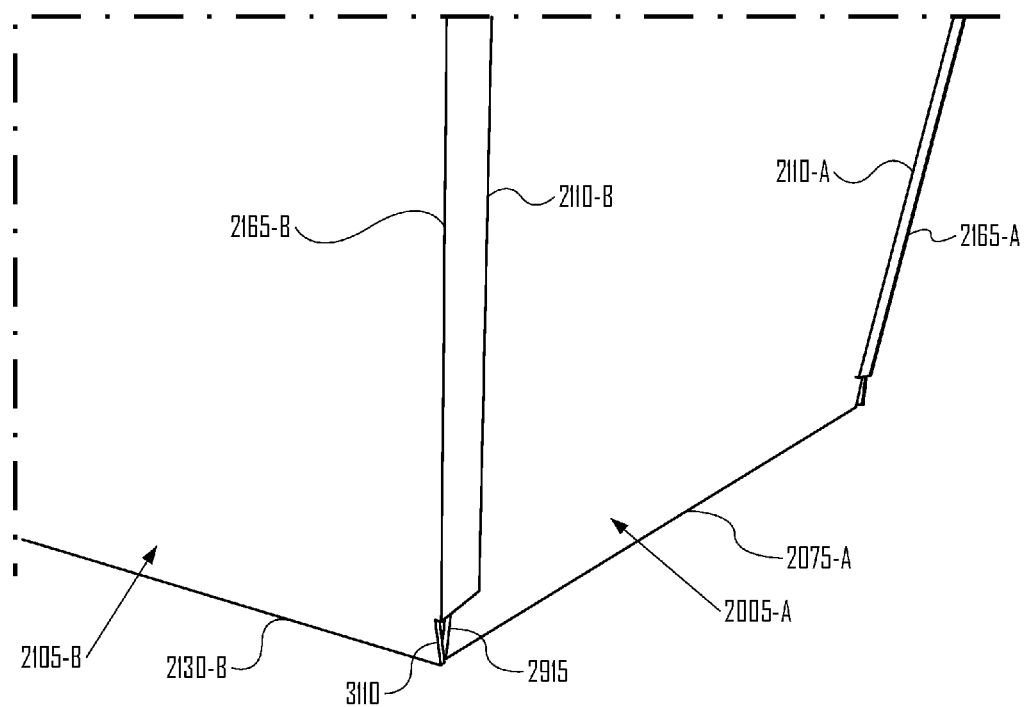
FIG. 33 is a close up perspective view of an embodiment of a bottom corner of an Outside Panel and an Inside Panel of a Vase Planter.

FIG. 33 is a close up perspective view of an embodiment of a bottom corner of an Outside Panel 2105-B and an Inside Panel 2005-A of a Vase Planter 1900. This Figure illustrates an exterior view of the bottom corner of Outside Panel 2105-B and Inside Panel 2005-A, showing how the components fit together, with 90 Degree Flanges 2110-B and 2110-A retaining Inside Panels 2005-A, preventing Inside Panel 2005-A from moving outward, away from the center of Vase 1900.

Figure 34:
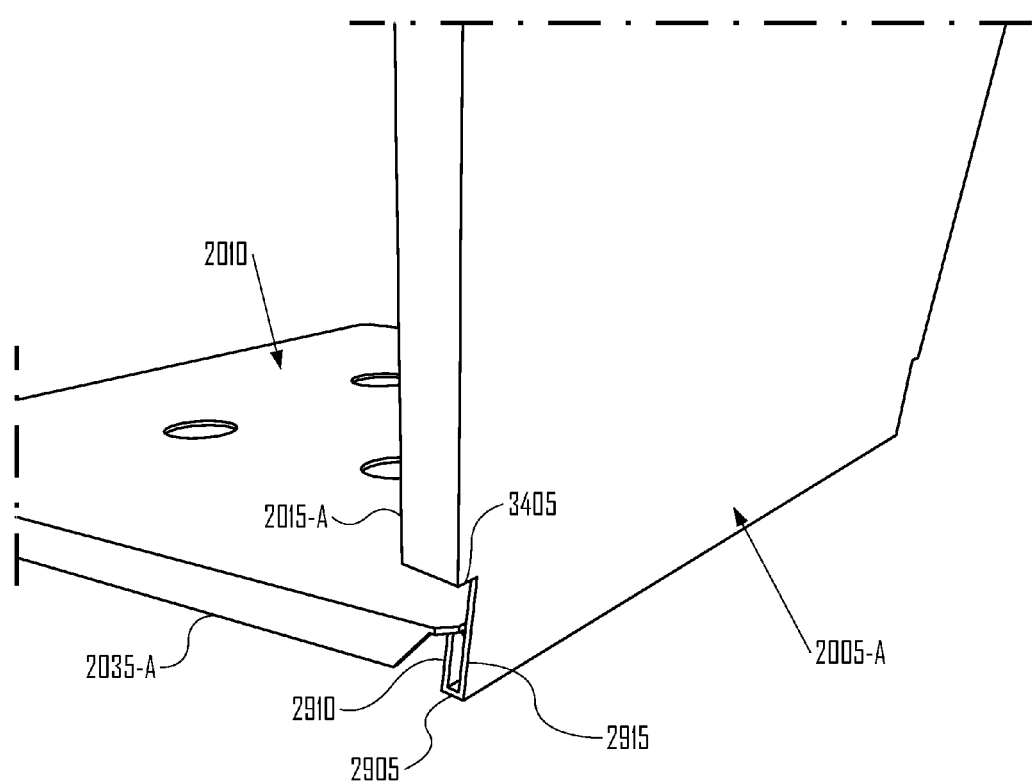
FIG. 34 is a close up perspective view of an embodiment of a bottom corner of an Inside Panel and a Base of a Vase Planter, from the same view angle and distance used in FIG. 33.

FIG. 34 is a close up perspective view of an embodiment of a bottom corner of an Inside Panel 2005-A and a Base 2010 of a Vase Planter 1900, from the same view angle and distance used in FIG. 33. This Figure illustrates that Inside Panel 2005-A comprises a Corner Notch with length CC at element 3405 (illustrated as 9/32"), length DD at element 2905 (illustrated as ¼" on the outside, ⅛" on the inside), and 180 Degree Flange 2910 of length GG (illustrated as 9/16").

Figure 35:
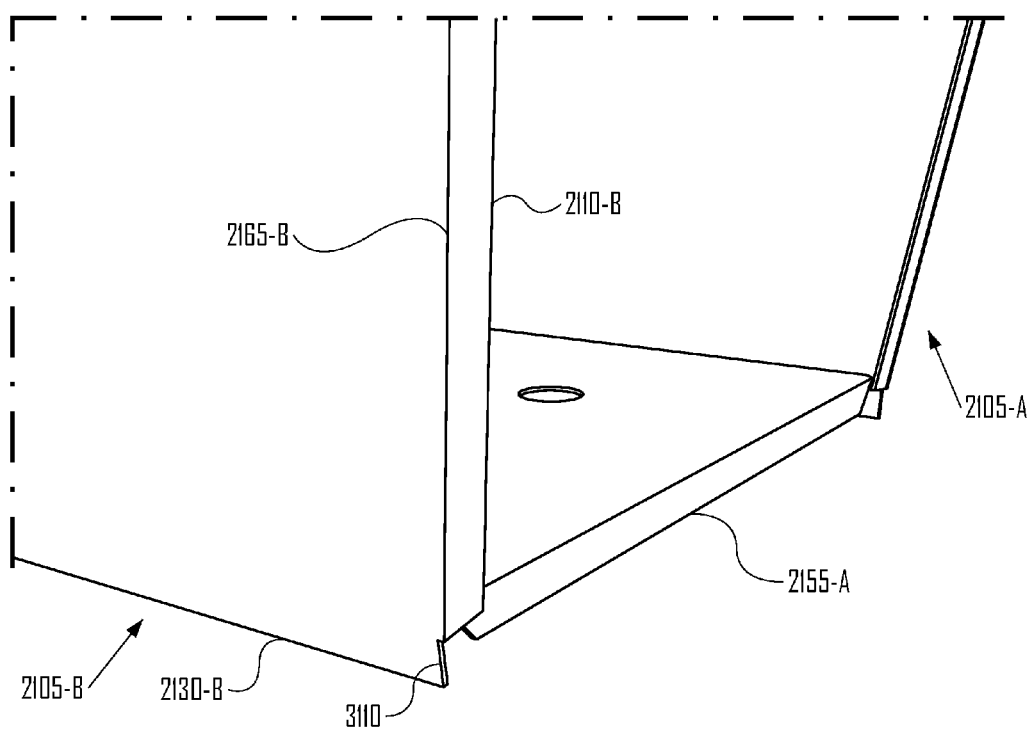
FIG. 35 is a perspective view of an embodiment of a bottom corner of an Outside Panel and a Base of a Vase Planter, from the same view angle and distance used in FIG. 33.

FIG. 35 is a close up perspective view of an embodiment of a bottom corner of an Outside Panel 2105-B and a Base 2010 of a Vase Planter 1900, from the same view angle and distance used in FIG. 33. This Figure illustrates Outside Panels 2105-A and 2105-B. This Figure is provided for the sake of completeness.

Figure 36:
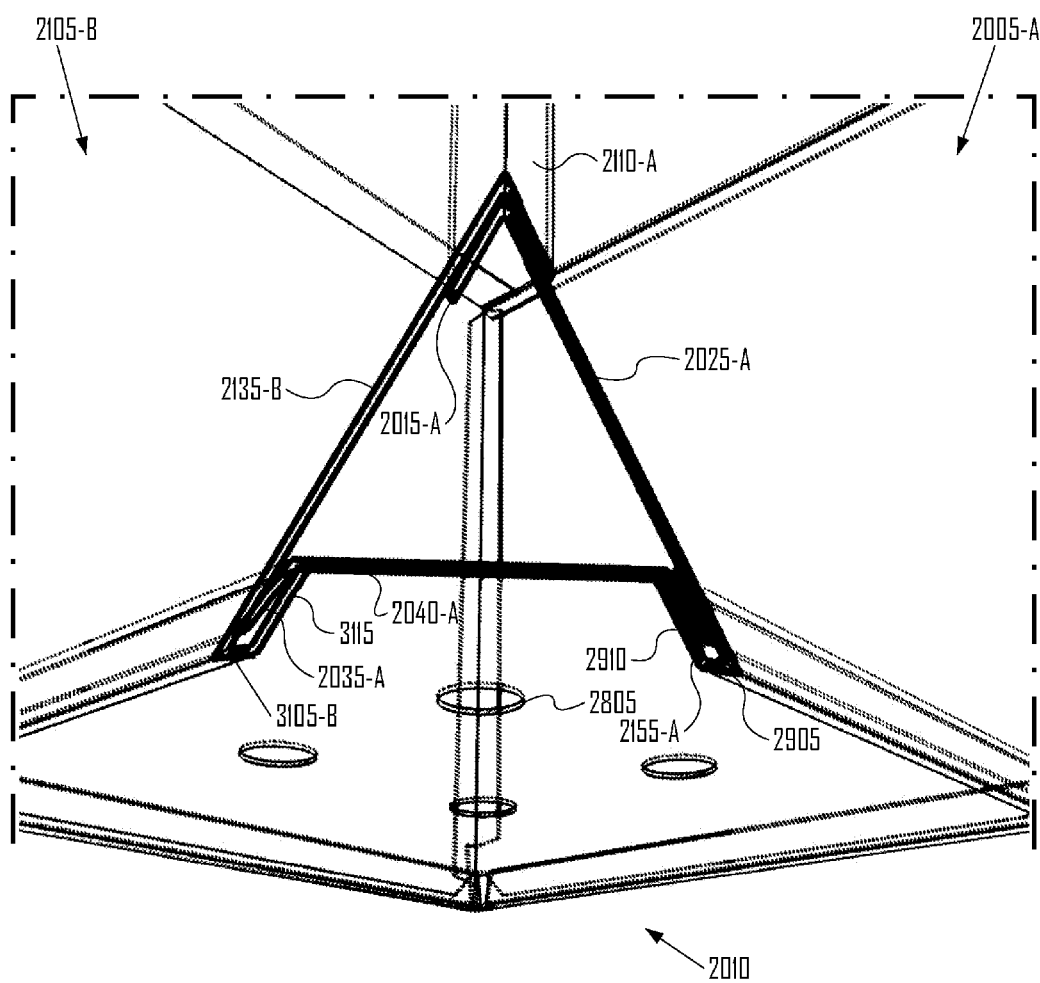
FIG. 36 is a close up perspective section view of an embodiment of a bottom corner of an Outside Panel, an Inside Panel, and a Base of a Vase Planter.
Figure 37:
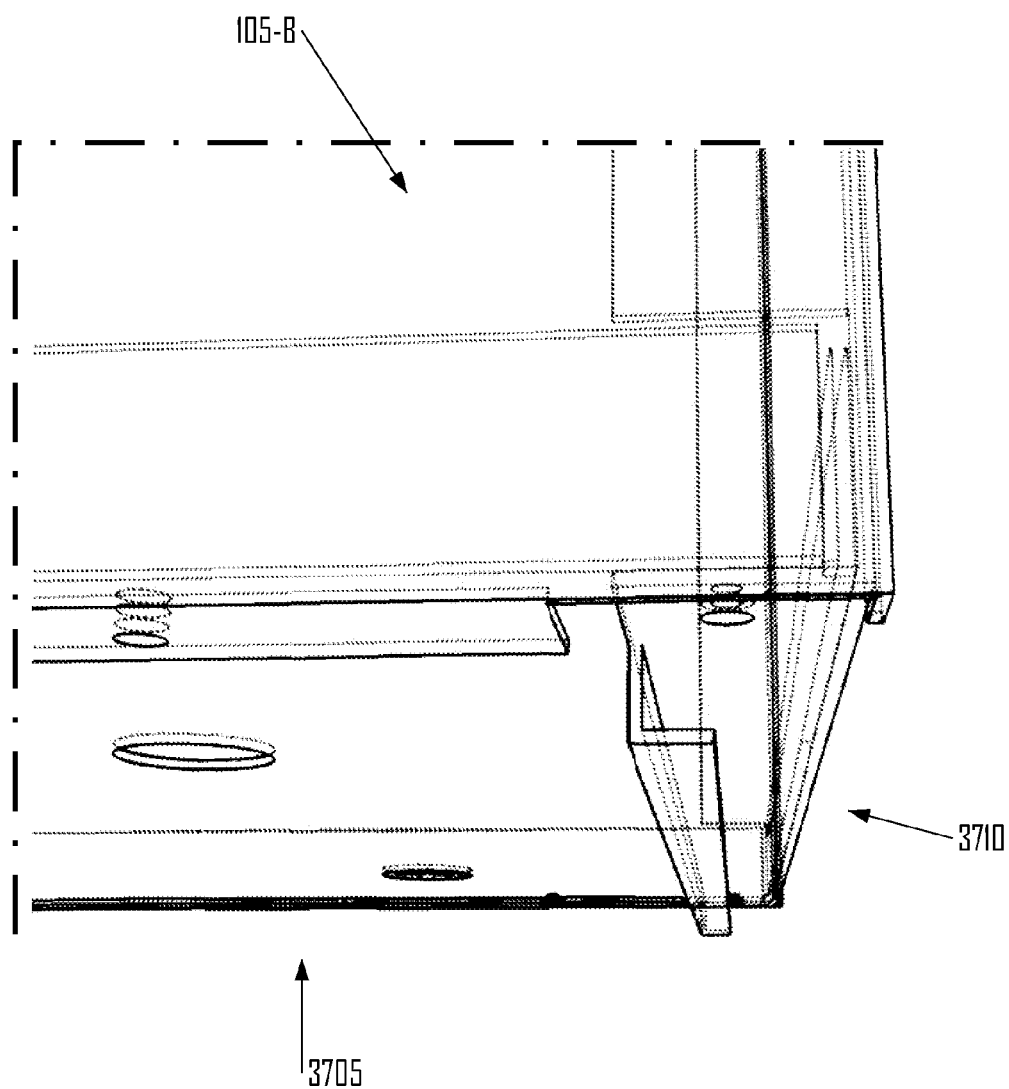
FIG. 37 is a close up perspective view of an alternative embodiment of a Rectangular Planter, illustrating the Base, Outside Panel, and Inside Panel.

FIG. 36 is a close up perspective section view of an embodiment of a bottom corner of an Outside Panel 2105-B, an Inside Panel 2005-A, and a Base 2010 of a Vase Planter 1900. The section view is 45 degrees relative to the intersection of the y-, x-, and z-axis. This Figure illustrates that Face 2025-A is retained by 90 Degree Flange 2110-A and that the bottom of both Inside Panel 2005-A and Outside Panel 2105-B are prevented from moving outward, away from the center of Vase 1900, by the 90 Degree Flanges 2035-A and 2155-A in the Base 2010 interlocking with the 180 Degree Flanges 3115 and 2910.

Because Face 2025 is retained by 90 Degree Flange 2110 and that the bottom of both Inside Panel 2005 and Outside Panel 2105 are prevented from moving outward, away from the center of Vase 1900, by the 90 Degree Flanges 2035 and 2155 in the Base 2010 interlocking with the 180 Degree Flanges 3115 and 2910 and because 180 Degree Flange 2115 in the Outside Panel 2105 engages with 90 Degree Flange 2015 in the Inside Panel 2005, preventing the top of Outside Panel 2105 from moving outward, away from the center of Vase 1900, the weight of dirt, plants, and other material in Vase 1900 secures the Structure without fasteners.

All 180 Degree Flanges disclosed herein, such as 180 Degree Flange 1405, 2910, 3115 and the like may be formed by first forming a 45 to 65 degree hem, such as with a press brake and an acute angle die, along the top edge of the 180 Degree Flange (where the Flange attaches to the remainder of the sheet). A piece of metal with a thickness the size of the opening which is desired and with a straight edge at least as long as the 180 Degree Flange is then laid on the sheet ("metal spacer"), butting against the edge of the hem. A top ram and flattening die may then be used to bend the hem over to 180 degrees, pressing the hem down onto the metal spacer, leaving an opening between the 180 Degree Flange and the sheet which is the thickness of the metal spacer.

The above detailed description of embodiments of the Rectangular Planter 100 and Vase Planter 1900s is not intended to be exhaustive or to limit the Structures to the precise form disclosed above. While specific embodiments of, and examples for, the Structures are described above for illustrative purposes, various equivalent modifications are possible within the scope of the system, as those skilled in the art will recognize.

The invention claimed is:

1. A structure in an x-, y-, z-coordinate system, wherein the structure is made from sheet metal of thickness X, comprising:
    a horizontally oriented bottom panel made from sheet metal of thickness X and comprising a horizontal rectangle, wherein a first side and a third side of the bottom panel are oriented along the z-axis and are mirror images of one another, and a second side and a fourth side of the bottom panel are oriented along the x-axis and are mirror images of one another, wherein the first and third sides define bottom panel z-sides and the second and fourth sides define bottom panel x-sides, wherein the bottom panel z- and x-sides comprise a 90 degree flange;

two similar vertically oriented inside panels made from sheet metal of thickness X, wherein a first side and a third side of each inside panel are oriented along the z-axis, and a second side and a fourth side of each inside panel are oriented along the y-axis, wherein the second and fourth sides of each inside panel are mirror images of one another, wherein the first side defines an inside panel top z-side, wherein the third side defines an inside panel bottom z-side, wherein the second and fourth sides define inside panel y-sides, and wherein each inside panel y-side comprises a 90 degree flange and wherein the inside panel bottom z-side comprises a 90 degree flange;

two similar vertically oriented outside panels made from sheet metal of thickness X, wherein a first side and a third side of each outside panel are oriented along the x-axis, wherein a second side and a fourth side of each inside panel are oriented along the y-axis, wherein the second and fourth sides of each outside panel are mirror images of one another, wherein the first side defines an outside panel bottom x-side, wherein the third side defines an outside panel top x-side, wherein the second and fourth sides define outside panel y-sides, wherein each outside panel bottom x-side comprises a 90 degree flange, wherein each outside panel y-side comprises a 90 degree flange, wherein each outside panel top x-side comprises a 180 degree flange, and wherein the 180 degree flange forms an outside panel top opening; wherein the two inside panels fit between the outside panel y-side 90 degree flanges, preventing the inside panels from movement outward, away from the center of the structure;

the outside panel top x-side 180 degree flanges fit over the top of the inside panel y-side 90 degree flanges, preventing the top of the outside panels from movement outward, away from the center of the structure;

the bottom panel rests upon the outside panel bottom x-side 90 degree flange and the inside panel bottom z-side 90 degree flange;

the bottom panel z-side 90 degree flanges prevent the bottom of the inside panels from moving in toward the center of the structure; and a first set of fasteners secure the outside panels and the bottom panel.

2. The structure according to claim 1, wherein each panel of the inside panels comprises two notches at the top corners of the panel.

3. The structure according to claim 2, wherein the outside panel top x-side 180 degree flange has a length FF between ¼" and ¾" and is configured to transfer at least some of the weight of the outside panel onto the inside panel.

4. The structure according to claim 1, wherein the inside panels comprise feet.

5. The structure according to claim 1, wherein the inside panel top z-side and the inside panel bottom z-side are mirror images of one another.

6. The structure according to claim 1, wherein a second set of fasteners secure the bottom panel and the inside panels.

7. The structure according to claim 1, wherein the thickness X of the sheet metal is between 1/16" and 5/64".

8. The structure according to claim 1, wherein the sheet metal is weathering steel.

9. The structure according to claim 1, wherein:
the inside panel has a length along the z-axis of A; and
the inside and outside panels have a length along the y-axis which is approximately A.

10. The structure according to claim 9, wherein M is 1 1/16", Y is 1", Z is ⅞", N is ½", and FF is 15/32".

11. The structure according to claim 1, wherein:
the bottom panel z- and x-side 90 degree flanges have a length M, between ½" and 1½;
each inside panel y-side 90 degree flanges have a length Y, between ⅞" and 1⅛";
each inside panel bottom z-side 90 degree flange has a length Y;
each outside panel bottom x-side 90 degree flange has a length Z, between ¾" and 1¼;
each outside panel y-side 90 degree flanges has a length N, between ⅜" and ¾" and
each outside panel top x-side 180 degree flange has a length FF, between ¼" and ¾".

12. The structure according to claim 1, wherein the inside panel y-side 90 degree flanges extend substantially to the bottom corners of the z- and y-sides and the bottom panel x-side 90 degree flanges are notched to accommodate the inside panel y-side 90 degree flanges.

13. The structure according to claim 1, wherein the bottom panel x-side 90 degree flanges extend substantially to the corner of the z- and x-sides and the inside panel y-side 90 degree flanges are notched to accommodate the bottom panel x-side 90 degree flange.

14. The structure according to claim 1, wherein the 90 degree flanges on the z- and y-sides of the bottom panel extend upward.

* * * * *